United States Patent
Shima

(10) Patent No.: US 8,291,084 B2
(45) Date of Patent: Oct. 16, 2012

(54) COMMUNICATION MEDIATING DEVICE FOR MEDIATING COMMUNICATION OVER NETWORK

(75) Inventor: Toshihiro Shima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 2692 days.

(21) Appl. No.: 10/491,338

(22) PCT Filed: Sep. 30, 2002

(86) PCT No.: PCT/JP02/10203
§ 371 (c)(1),
(2), (4) Date: Apr. 1, 2004

(87) PCT Pub. No.: WO03/032175

PCT Pub. Date: Apr. 17, 2003

(65) Prior Publication Data
US 2004/0215785 A1      Oct. 28, 2004

(30) Foreign Application Priority Data

Oct. 2, 2001 (JP) ................................. 2001-306595
Nov. 29, 2001 (JP) ................................. 2001-364779

(51) Int. Cl.
*G06F 15/16* (2006.01)
*G06F 15/173* (2006.01)
(52) U.S. Cl. ........................ 709/227; 709/203; 709/239
(58) Field of Classification Search .................. 709/203, 709/217–227, 236–239
See application file for complete search history.

(56) References Cited

U.S. PATENT DOCUMENTS

| | | | |
|---|---|---|---|
| 5,416,842 A | 5/1995 | Aziz | |
| 5,588,060 A | 12/1996 | Aziz | |
| 5,633,933 A | 5/1997 | Aziz | |
| 5,668,877 A | 9/1997 | Aziz | |
| 5,960,177 A * | 9/1999 | Tanno | 709/229 |
| 6,026,167 A | 2/2000 | Aziz | |
| 6,088,796 A | 7/2000 | Cianfrocca et al. | |

(Continued)

FOREIGN PATENT DOCUMENTS
DE           100 52 945 A1      8/2001
(Continued)

OTHER PUBLICATIONS
European Search Report, Jan. 14, 2003.
(Continued)

*Primary Examiner* — Yasin Barqadle
(74) *Attorney, Agent, or Firm* — Sughrue Mion, PLLC

(57) ABSTRACT

A mediation server 200 mediates a print demand from a client device 100 to a printing device 300. In order to elude a firewall F/W set between the mediation server 200 and the printing device 300, the printing device 300 first sends an HTTP request to the mediation server 200. The mediation server 200 sends back an HTTP response including a print demand to the printing device 300. Encrypted communication may be established between the client device 100 and the printing device 300 according to the following procedure. The mediation server 200 decrypts cipher data, which is encrypted with a public key by the client device, with a private key, re-encrypts the decrypted data with another private key, and mediates the encrypted data to the printing device 300. The printing device 300 decrypts the encrypted data with the public key and carries out printing. This arrangement enables the printing device to carry out printing in response to a demand from the client device via respective secure network environments.

9 Claims, 19 Drawing Sheets

U.S. PATENT DOCUMENTS

| | | | |
|---|---|---|---|
| 6,091,820 A | 7/2000 | Aziz | |
| 6,130,757 A * | 10/2000 | Yoshida et al. | 358/1.15 |
| 6,349,336 B1 | 2/2002 | Sit et al. | |
| 6,552,813 B2 * | 4/2003 | Yacoub | 358/1.1 |
| 6,553,422 B1 | 4/2003 | Nelson | |
| 6,927,866 B2 * | 8/2005 | Konishi | 358/1.13 |
| 6,982,953 B1 * | 1/2006 | Swales | 370/218 |
| 7,266,590 B2 | 9/2007 | Nakaoka et al. | |
| 7,370,090 B2 | 5/2008 | Nakaoka et al. | |
| 7,461,138 B2 | 12/2008 | Mukaiyama et al. | |
| 2002/0138557 A1 | 9/2002 | Mukaiyama et al. | |
| 2002/0186408 A1 | 12/2002 | Nakaoka et al. | |

FOREIGN PATENT DOCUMENTS

| | | |
|---|---|---|
| EP | 1 056 247 A2 | 11/2000 |
| EP | 1 071 254 A | 1/2001 |
| EP | 1 091 275 A | 4/2001 |
| EP | 1 126 675 A2 | 8/2001 |
| JP | 62-062639 A | 3/1978 |
| JP | 01-143446 A | 6/1989 |
| JP | 07-245605 A | 9/1995 |
| JP | 08-008895 A | 1/1996 |
| JP | 8-314835 A | 11/1996 |
| JP | 09-69831 A | 3/1997 |
| JP | 10-322325 A | 12/1998 |
| JP | 10-341223 A | 12/1998 |
| JP | 2000-099462 A | 4/2000 |
| JP | 2000-222147 A | 8/2000 |
| JP | 2000-339237 A | 12/2000 |
| JP | 2001-154953 A | 6/2001 |
| JP | 2001-236183 A | 8/2001 |
| WO | 00/05642 A1 | 2/2000 |
| WO | 00/24154 A | 4/2000 |

OTHER PUBLICATIONS

Masahiro Manbo et al, "Lecture of the Current Situation on Crypotography", Domestic Technological Magazine 1997-00222-008, vol. 8, 1997, pp. 1-16.

* cited by examiner

COMMUNICATION MEDIATING DEVICE FOR MEDIATING COMMUNICATION OVER NETWORK

TECHNICAL FIELD

The present invention relates to a technique of providing a service from a service device and of establishing security communications in a secure network environment.

BACKGROUND ART

Recent advancement of network technology provides a wide spread use of a network system where multiple client devices share a service device connected to the network. The service device may be any of various devices including printers, cameras, displays, information processing devices such as supercomputers and other special purpose computers, and data recording devices.

The user of each client device may send a service demand to the service device without checking the working status of the service device. If, however, the service device has any failure or trouble, the client device is required to send the service demand again.

Incidentally, security of services via a network is provided by various methods.

One rather primitive method does not make always-on connection of the service device with the network but employs dialup connection to connect the service device with the network on each occasion of a desired service. Another method places a firewall in the service device. In these environments, however, the client device and the service device can not establish one-to-one connection at an arbitrary timing. The client device is allowed to check the working status of the service device and resend the service demand to the service device at only restricted timings.

Another method for the security is encrypted communication. Known cryptographic techniques include common key cryptosystems like DES (Data Encryption Standard) and public key cryptosystems like SSL (Secure Sockets Layer).

FIG. 21 is an explanatory view showing security communication in a public key cryptosystem. A server keeps a private key for decryption prepared in advance. A client device prepares a common key shared with the server in advance and holds a public key corresponding to the private key kept by the server. The client device receives the public key from the server in non-encrypted communication.

At timing Sa101, the server sends the public key to the client device. At timing Sa103, the client device sends cipher data of the common key encrypted with the received public key to the server. At timing Sa05, the server decrypts this cipher data, so that the common key is shared by the server and the client device.

The common key is used for the subsequent communication. The server encrypts communication data with the common key and sends the encrypted communication data to the client device at timing Sa201. The client device decrypts the encrypted communication data with the common key at timing Sa203. The client device sends data in similar security communication at timings Sa301 and Sa303.

However, these security communications impose on the system heavy management load including installation, update, and confidentiality of the private key. Especially when the client device is a device like a printer, strict management of the private key faces significant difficulties. Such a device is generally located at a place infrequently accessed by the users, compared with other ordinary client devices, and often has an insufficient hardware or software security mechanism to prevent illicit and unauthorized accesses, due to cost restrictions. Management of private keys for multiple client devices is required to establish security communications with the multiple client devices. This undesirably increases the management load.

SUMMARY OF THE INVENTION

An object of the invention is thus to eliminate the drawbacks discussed above and to provide a technique of making a service device provide a service in a secure network environment, and of establishing security communications with relieved load of key management.

In order to attain at least part of the above objects, the present invention is directed to a first mediation apparatus for mediating a service demand from a client device to a service device. Which provides a predetermined service, in a specific environment that does not allow the client device and the service device both connecting with a network to establish one-to-one connection at an arbitrary timing. The first mediation apparatus comprises: a service device communication module that receives preset preliminary communication from the service device, prior to mediation, and establishes communication with the service device in response to the reception of the preset preliminary communication; a selective information provision module that provides the client device with information used for specifying the service device in established communication as a destination of mediation of the service demand; an input module that inputs the service demand and specification of the destination of mediation; and a mediation module that mediates the input service demand to the specified destination of mediation.

The mediation apparatus of the invention establishes communication by taking advantage of the preliminary communication even in the network environment that does not allow one-to-one connection at an arbitrary timing. The service device is thus allowed to execute the service demand.

The first mediation apparatus according to the invention enables the user to remotely check the status of the service device in this network environment. For example, the user is allowed to determine whether a desired service is executable by a certain service device or to select a service device that is capable of executing a desired service among multiple service devices.

The preliminary communication may be made in various modes. For example, in a preset network environment that dynamically changes information, such as an address, for identifying a communication path to the service device, the preliminary communication may be made to obtain the information successively. In another example, the preliminary communication may be made to keep the established connection.

The preliminary communication is made for establishment of communication and may thus send empty data without any substantial contents. When interrupted data transmission for a preset time period cuts off the connection, sending the empty data at regular intervals keeps the connection.

The service device may be any of diverse devices including printers, cameras, display devices of CRT and liquid crystal technologies, information processing devices such as supercomputers and other special purpose computers, and data recording devices.

The network may be any of various networks including wide area networks like the Internet and local area networks.

In this invention, it is preferable that the communication is established by connection of the service device to the mediation apparatus. This arrangement enables establishment of communication even when a firewall is set to restrict accesses to the service device.

The present invention is also applicable to an environment that dynamically changes information, such as an address, for identifying a communication path to the service device. One example is a network environment using a dynamic address change mechanism like NAT (Network Address Translation) or PAT (Port Address Translation) or a dialup connection mechanism.

In one preferable embodiment of the invention, the mediation apparatus further includes a specific information storage module that stores specific information for identifying the service device. The service device is identified by comparison between at least part of information received on the preliminary communication and the specific information.

This arrangement ensures adequate processing for the source of the preliminary communication and enhances the convenience of the mediation apparatus. This arrangement also enables the mediation apparatus to monitor the status of each service device and to send information on the status of the service device to the client device or another source of preliminary communication. The client device receives information on the service device and utilizes the information for a print demand.

The specific information may be an address of the service device on the network or any other information for identifying a communication path to the service device.

In the mediation apparatus of the invention, it is preferable that the specific information is different from the address of the service device. Even when the information for identifying the communication path to the service device is changed, each service device can be identified successively. The mediation apparatus may manage each service device, regardless of its address. The specific information other than the address of the service device is, for example, a serial number uniquely allocated to each service device by its manufacturer or an identifier or an identification number allocated to each service device by the user.

In another preferable embodiment of the invention, the mediation apparatus further includes a preliminary communication processing module that checks a status of communication to be established based on the preliminary communication and sends a notice representing a result of the check to a preset destination related to the service device. This arrangement enables the mediation apparatus to monitor and manage the status of the service device.

The notice is sent, for example, at the time of consumption of expendables or at the time of a failure of the service device. The notice may be push-type notification or notification to a portable device. This ensures transmission of information without delay.

The mediation apparatus of this embodiment further includes a specific information storage module that stores specific information for identifying the service device and the destination related to the service device. The preliminary communication processing module sends the notice to a destination identified by a comparison between at least part of information received on the preliminary communication and the specific information.

This arrangement ensures management of the destination for each service device.

The present invention is also embodied as a service device. The service device receives a service demand via a network and provides a service. The service device comprises: a preliminary communication module that transmits preset preliminary communication to a predetermined external device and makes the predetermined external device establish communication with the service device in response to the transmission of the preset preliminary communication; a demand reception module that receives a service demand sent from the predetermined external device via the network; and a service provision module that provides the service.

In the invention, the preliminary communication may be made at any of diverse timings, for example, in an always-on state, in an intermittent-on state, and at every preset operation of the service device.

In the mediation apparatus of the invention, the preliminary communication may be made at least either of at a power-on time of the service device and at a time of recovery of cutoff connection of the service device to the network.

The present invention is also directed to a second mediation apparatus that mediates communication between two client devices connected via a network. The mediation apparatus includes: a key storage module that stores at least one private key used for communication with the client device; a data acquisition module that acquires cipher data encrypted with either of a public key corresponding to the private key and a key set in communication with the private key and the public key, from the first client device; a data processing module that decrypts the cipher data with the corresponding key and re-encrypts the decrypted data with a key set in communication with the private key and the public key; and a transmission module that sends the encrypted data to the second client device.

This arrangement enables mediation of security communication between the first client device and the second client device, which do not manage the private key, thus effectively relieving the processing loads of the first client device and the second client device for security communications. No client device is accordingly required to manage the private key. The mediation apparatus centrally manages the private keys even in the case of security communications with a large number of client devices. This arrangement relieves the user from troublesome operations of installing and updating private keys in respective client devices.

Here the security communication may be any of known security communications taking effective measures against illicit and unauthorized accesses including interception and falsification of data and spoofing.

In the mediation apparatus of this invention, the private key may be common to the two client devices.

This arrangement ensures security communications between the first client device and the second client device, while simplifying the mechanism of the mediation apparatus, for example, the mechanism of encryption and decryption with the private key and the mechanism of sending the public key. The public keys used by the first client device and the second client device may be common or may be different.

In one preferable application of the invention, the mediation apparatus utilizes communication with the second client device to obtain status information of the second client device.

This arrangement enables the mediation apparatus to carry out the required processing, based on the status information of the second client device. For example, when the second client device is a service device and the first client device sends a service demand, the mediation apparatus sends required information for the service demand to the first client device.

There are many pieces of the status information. One example is information regarding the working status of the second client device. When the second client device is a service device, other examples include information regarding executability of a service demand and information regarding a record of execution of past service demands.

In one preferable embodiment of the present invention, the first client device is a demand client device that sends a service demand, and the second client device is a service device that provides a service in response to the service demand. The mediation apparatus transfers data, which is received from the second client device, without encryption to the first client device.

This arrangement effectively relieves the encryption and decryption-related load of the mediation apparatus as well as the first and the second client devices.

All of the data for transmission may be transferred without encryption, or part of the data may be transferred after encryption.

In another preferable embodiment of the mediation apparatus of the invention, the data processing module selects a mode of the encryption and the decryption according to contents of data.

The specification of the security communication to be mediated is set desirably according to the contents of the data.

The data processing module may not carry out the encryption or the decryption, and the mediation apparatus may mediate non-security communication.

The mediation apparatus of the invention may mediate a service demand relating to printing.

The present invention is not restricted to the above mediation apparatuses but may be embodied in various ways; for example, mediation methods, computer programs for causing a computer to implement these methods, signals equivalent to the computer programs, and recording media on which such computer programs are recorded.

Typical examples of the recording medium include flexible disks, CD-ROMs, magneto-optical disks, IC cards, ROM cartridge, punched cards, prints with barcodes or other codes printed thereon, internal storage devices (memories like RAMs and ROMs) and external storage devices of the computer, and a variety of other computer readable media.

BEST MODES OF CARRYING OUT THE INVENTION

Figure 1:
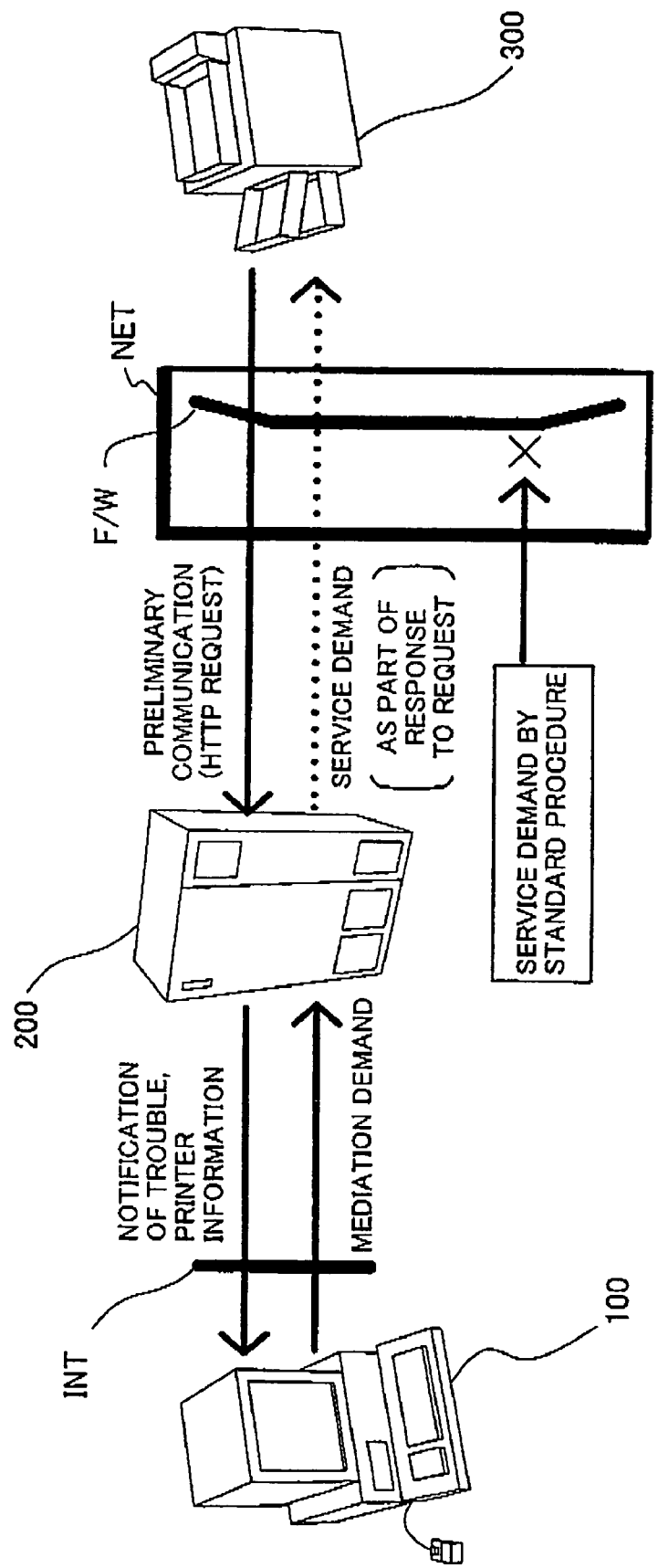
FIG. 1 is an explanatory view illustrating the general configuration of a print mediation system.

Some modes of carrying out the invention are described below as preferred embodiments in the following sequence:
   A. First Embodiment
      A1. System Configuration
      A2. Functional Block Structure
      A3. Print Mediation Process
      A4. Notification of Trouble Information
      A5. Modification
   B. Second Embodiment
   C. Third Embodiment
   D. Fourth Embodiment A. First Embodiment FIG. 1 is an explanatory view illustrating the general configuration of a print mediation system. The print mediation system includes a client device 100, a mediation server 200, and a printing device 300. The mediation server 200 is connected with the client device 100 via a network INT and is connected with the printing device 300 via another network NET. Any of wide area networks like the Internet and relatively restricted networks like LAN (Local Area Network) and computer online communication may be applied to these networks. The numbers of the client device 100 and the printing devices 300 are not restricted to one but may be multiple.

The networks INT and NET are different in this embodiment for convenience of explanation, although a single common network is applicable.

A firewall F/W is set on the network NET. The firewall F/W monitors network traffic to give permission to rule-abiding authentic communications and detect illicit accesses. The firewall F/W may be constructed by software in the printing device 300 or may otherwise be built in a gateway, such as a router, of connecting the printing device 300 to the network NET. The firewall F/W permits HTTP requests sent from the printing device 300 and HTTP responses sent to the printing device 300, while rejecting other communications.

The client device 100 sends a print demand to the mediation server 200, in response to the user's operation. The mediation server 200 mediates this print demand to the printing device 300. The printing device 300 receives the print demand and carries out a printing service. The mediation server 200 utilizes the HTTP protocol to go through the firewall F/W and mediate the print demand to the printing device 300 according to the procedure discussed below.

The printing device 300 first sends an HTTP request to the mediation server 200 and receives an HTTP response from the mediation server 200. A message may also be sent and received in the form of parameters of CGI (Common Gateway Interface) or the like in this HTTP communication process.

Once the HTTP communication is established, the mediation server 200 may send a print demand as part of an HTTP response to the printing device 300.

In the configuration of this embodiment, communication between the printing device 300 and the mediation server 200 is established by sending an HTTP request from the printing device 300 to the mediation server 200. The printing device 300 sends an HTTP request as preliminary communication at each power-on, regardless of presence or absence of a print demand. The preliminary communication is repeatedly carried out to keep the communication between the printing device 300 and the mediation server 200. The mediation server 200 grasps the capacity of the printing device 300 by this preliminary communication and notifies the client device 100 of the capacity.

A2. Functional Block Structure

Figure 2:
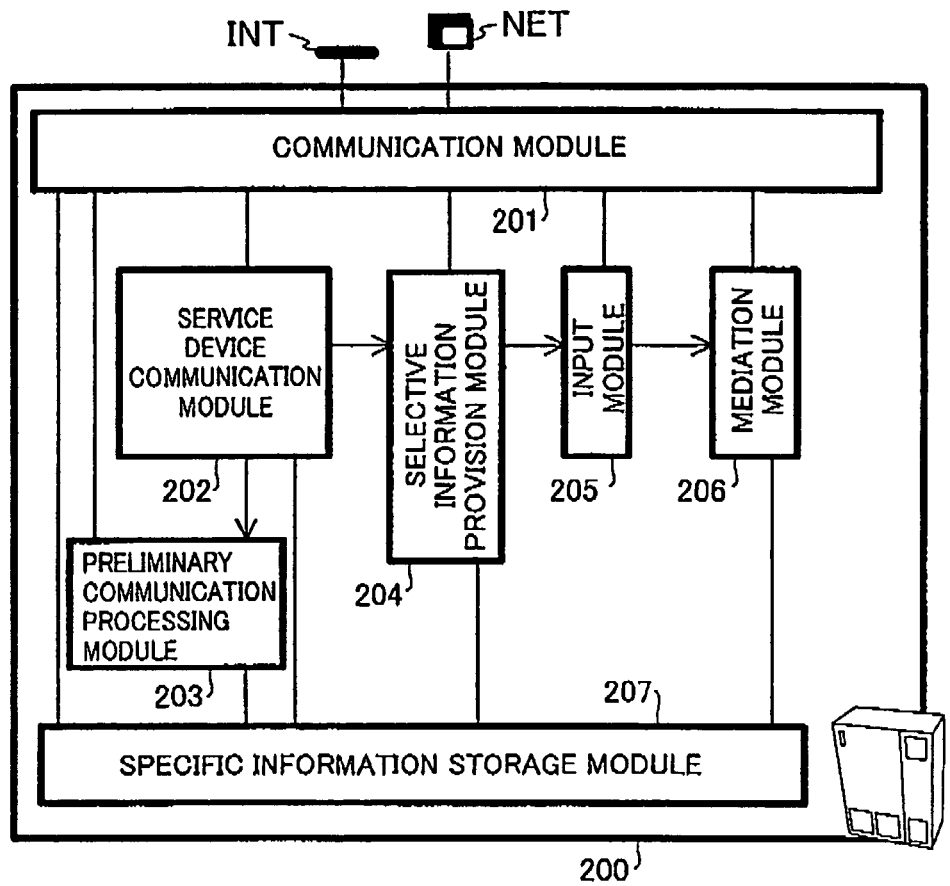
FIG. 2 is an explanatory view showing the functional block structure of a mediation server.

FIG. 2 is an explanatory view showing the functional block structure of the mediation server. As mentioned above, the mediation server 200 functions to receive the preliminary communication, disclose the information on the printing device 300, accept a print demand, and mediate the print demand to the printing device 300.

A communication module 201 takes charge of communications with the networks INT and NET. A service device communication module 202 receives the preliminary communication and manages information included in the preliminary communication.

A preliminary communication processing module 203 monitors the communication established by the preliminary communication. When an abnormality of the printing device is detected in the monitoring process, the preliminary communication processing module 203 notifies a preset destination related to the printing device of the occurrence of abnormality.

A specific information storage module 207 stores in advance information on the printing device, such as an address of the printing device. The stored information is not restricted to the address but may be selectable among various pieces of information for identifying the printing device, for example, a serial number of the printing device. This information is utilized by the service device communication module 202, a selective information provision module 204, and a mediation module 206.

The selective information provision module 204 obtains the status of the service device by preliminary communication and notifies the client device of the status.

An input module receives a print demand from the client device.

The mediation module 206 mediates the print demand received from the client device to the printing device.

Figure 3:
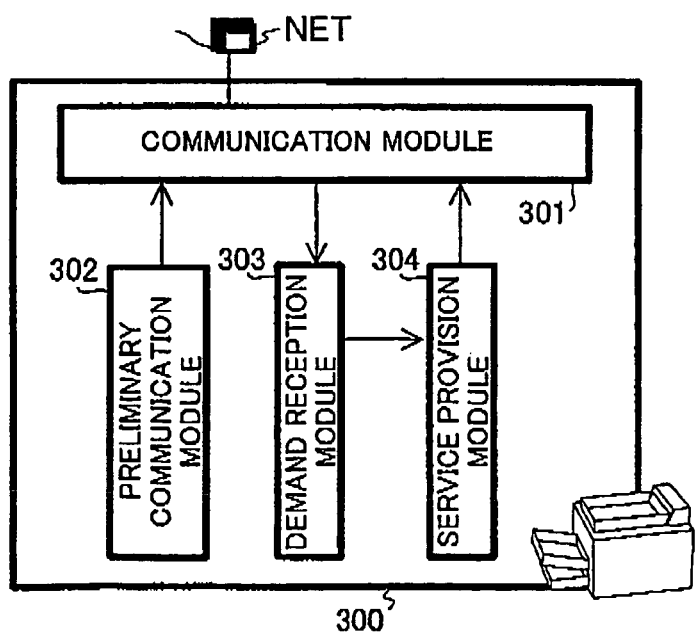
FIG. 3 is an explanatory view showing the functional block structure of a printing device.

FIG. 3 is an explanatory view showing the functional block structure of the printing device. The printing device 300 has two functions, execution of a print demand and preliminary communication to the mediation server 200.

A preliminary communication module 302 transmits preliminary communication to the mediation server 200. A demand reception module 303 receives a print demand sent from the mediation server 200. A service provision module 304 executes printing in response to the received print demand.

A3. Print Process

Figure 4:
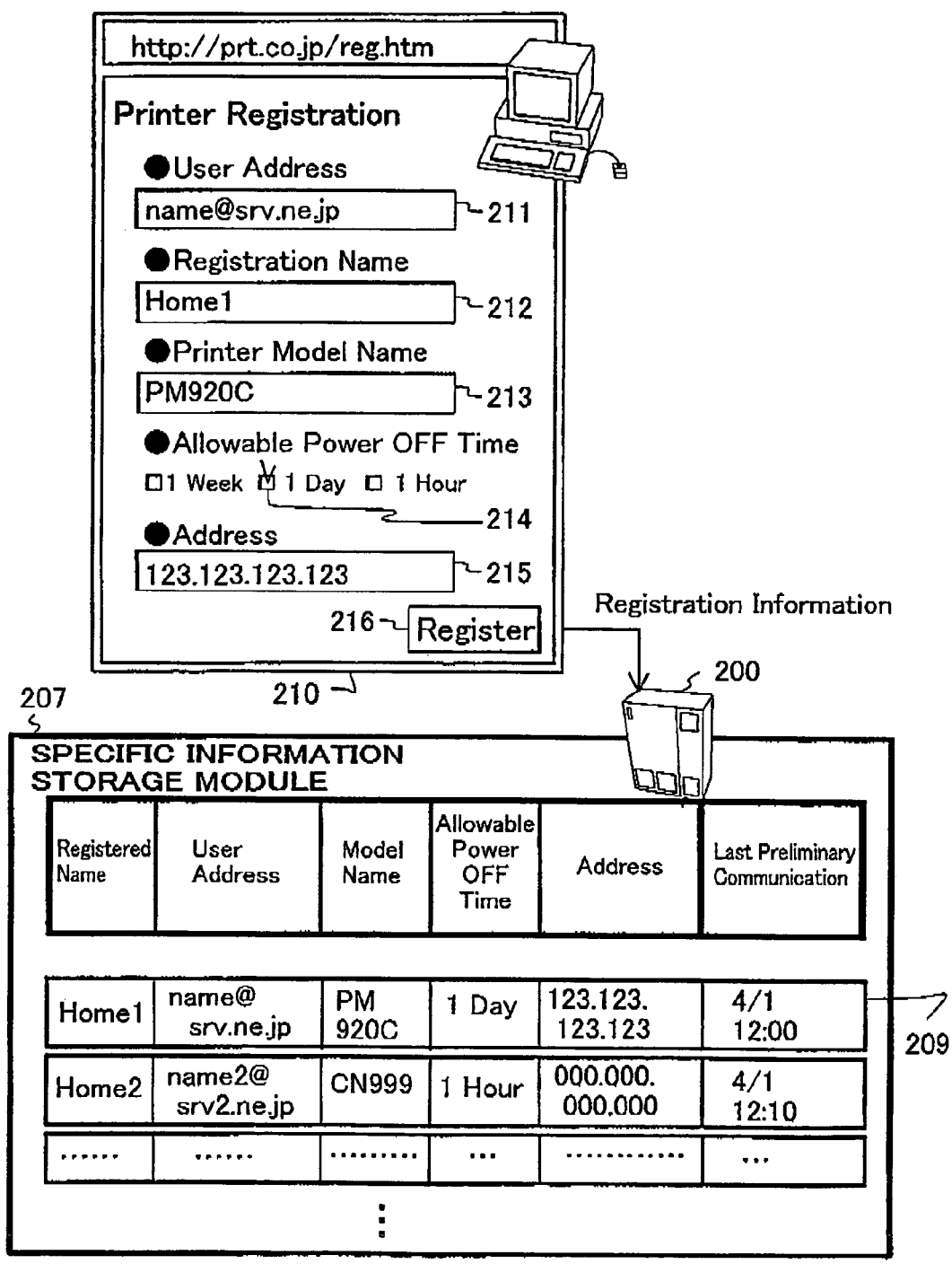
FIG. 4 is an explanatory view showing a procedure of registering a printing device into the mediation server 200.

FIG. 4 is an explanatory view showing a procedure of registering a printing device into the mediation server 200. The registration process of this embodiment uses an interface window given in the form of an HTML file by the mediation server 200 to a browser of the client device 100.

An interface 210 is a window opened by the browser. In this illustrated example, entries in a user address input field 211, a registration name input field 212, a model name input field 213, allowable power OFF time check boxes 214, and an address input field 215 are respectively a mail address 'name@srv.ne.jp', a registered name 'Home1' of a printing device, a model name 'PM920C' of the printing device, '1 day', and an IP address '123.123.123.123' of the printing device. The allowable power OFF time is a criterion, based on which the mediation server 200 determines the cause of failed communication with the printing device. When the period of failed communication is shorter than the allowable power OFF time, the mediation server 200 determines that the cause of failed communication is a power-OFF of the printing device. When the period of failed communication is longer than the allowable power OFF time, on the other hand, the mediation server 200 determines that the cause of failed communication is some abnormality of the printing device.

In response to the user's click of a registration button 216, the above pieces of information are registered into the specific information storage module 207 of the mediation server 200. The illustration also includes the data structure in the specific information storage module 207. The registered information above corresponds to a record of the registered name 'Home1'. Past communication results with each printing device, as well as the above registered information, are recorded in the specific information storage module 207. In the structure of this embodiment, the time when the preliminary communication was received last from each printing device is also recorded.

Figure 5:
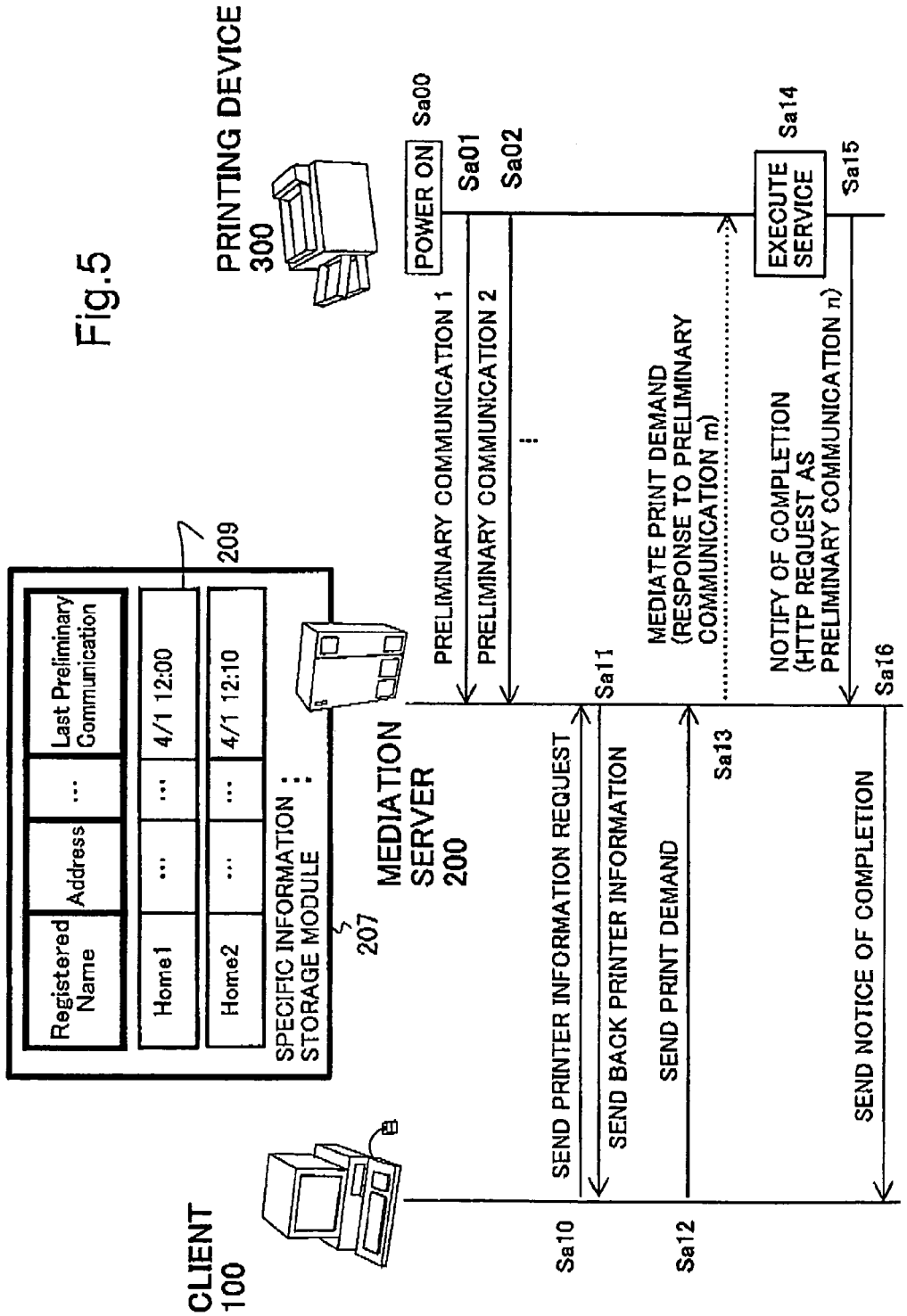
FIG. 5 is a flowchart showing a print mediation process.

FIG. 5 is a flowchart showing a print mediation process.

The printing device 300 starts preliminary communication to the mediation server 200 upon power-on (timing Sa00). The preliminary communication means transmission of an HTTP request and is repeatedly made at preset intervals, that is, at timings Sa01, Sa02 . . . . Since a status of the printing device 300 is included in the parameters of the HTTP request, the printing device 300 notifies the mediation server 200 of the status at regular intervals.

In this embodiment, connection is cut off after completion of every preliminary communication. Such disconnection effectively saves the hardware resources of the printing device and the mediation server. The interval of preliminary communication is set arbitrarily. As discussed later, the technique of this embodiment utilizes the preliminary communication for detection of an abnormality arising in the printing device. The shorter interval is thus preferable to keep up the currency of detection. The user may specify and change the interval. The printing device or another relevant device may dynamically change the interval based on predetermined conditions.

The mediation server 200 records the time when the preliminary communication was received last from the printing device 300, into the specific information storage module 207. The mediation server 200 determines whether mediation of a print demand to the printing device is executable or non-executable, based on the time elapsed since the last preliminary communication. Before a preset time period elapses, on the assumption that next preliminary communication will be received normally, it is determined that mediation of a print demand to the printing device is executable. After elapse of the preset time period, however, it is determined that mediation of a print demand to the printing device is non-executable.

Prior to a print demand, the client device 100 first sends a printer information request to the mediation server 200 (timing Sa10). The mediation server 200 sends back statuses of respective printing devices obtained by preliminary communications to the client device 100, in response to the printer information request (timing Sa11). The mediation server 200 also sends the results of determination showing executable or non-executable mediation of a print demand to the respective printing devices. The HTTP protocol is applicable to communication between the client device 100 and the mediation server 200.

The client device 100 specifies a printing device to be used for printing, based on the given printer information and sends a print demand to the mediation server 200 (timing Sa12). The mediation server 200 mediates the received print demand to the specified printing device (timing Sa13). Since the preliminary communication with the printing device as the destination of mediation has been established, the mediation server 200 sends the print demand as part of an HTTP response to any preliminary communication m. The printing device 300 executes printing in response to the received print demand (timing Sa14) and notifies the mediation server 200 of completion of printing as part of an HTTP request as any preliminary communication n. At timing Sa16, the mediation server 200 sends a notice of completion to the client device 100.

Figure 6:
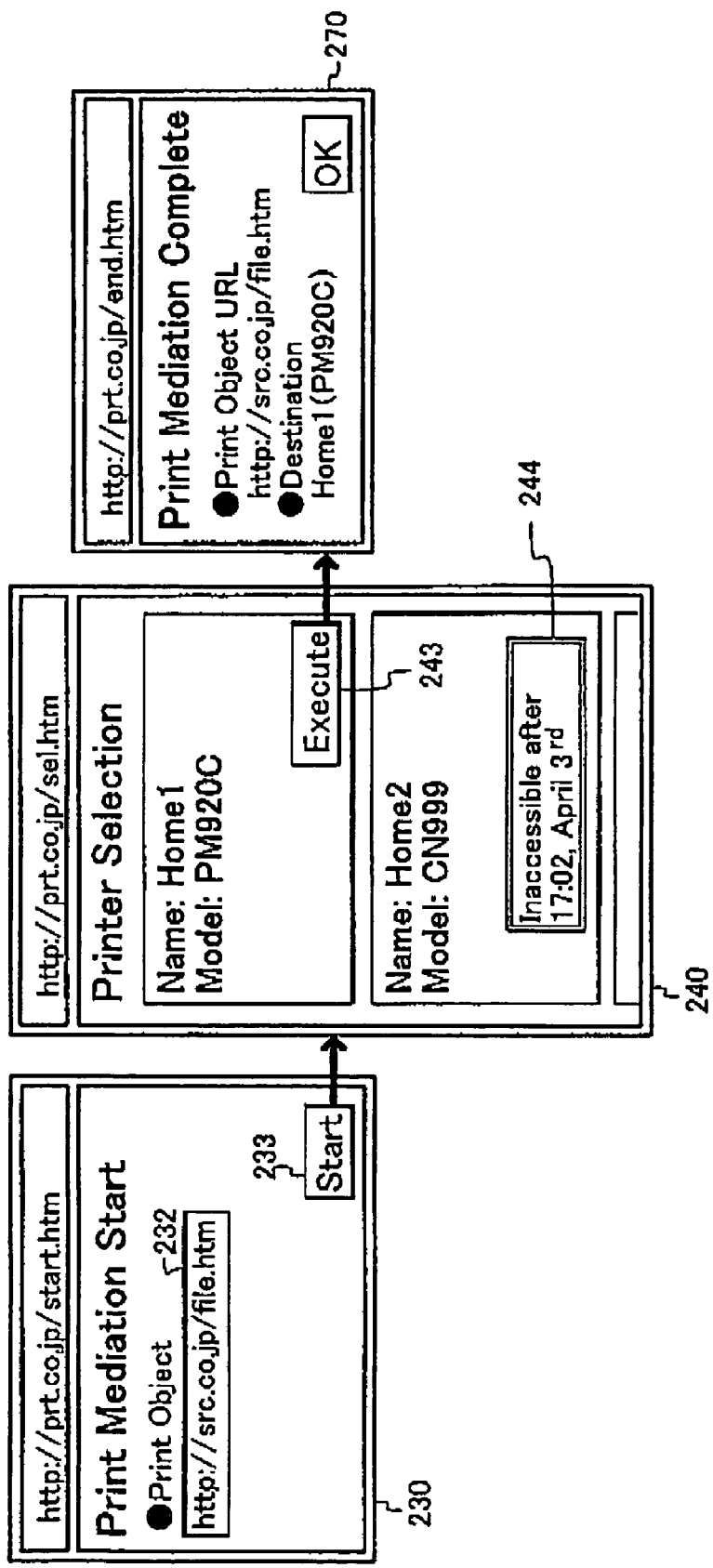
FIG. 6 is an explanatory view showing an interface for a print demand.

FIG. 6 is an explanatory view showing an interface for a print demand, which is opened by the browser of the client device 100.

A print mediation start window 230 opens to start the print demand process. When the user specifies the URL of a content as an object to be printed in a print object input field 232 and clicks a print start button 233, a printer information request is sent to the mediation server 200 (timing Sa10 in FIG. 5). A printing device selection window 240 is then opened (timing Sa11 in FIG. 5).

The printing device selection window 240 shows information regarding available printing devices 'Home1' and 'Home2'.

In this illustrated example, it is assumed that the printing device 'Home2' is in a non-executable state for mediation of a print demand, because of a power-off state or another reason. Unprintable state information 244 is given for the unavailable printing device. The unprintable state information 244 includes the time of the last preliminary communication.

The printing device 'Home1' is available. The user clicks a print execution button 243 to send a print demand (timing Sa13 in FIG. 5). On completion of printing by the printing device 300, the mediation server 200 opens a window 270 on the client device 100, based on the notice of completion (timing Sa16 in FIG. 5).

A4. Notification of Trouble Information

Figure 7:
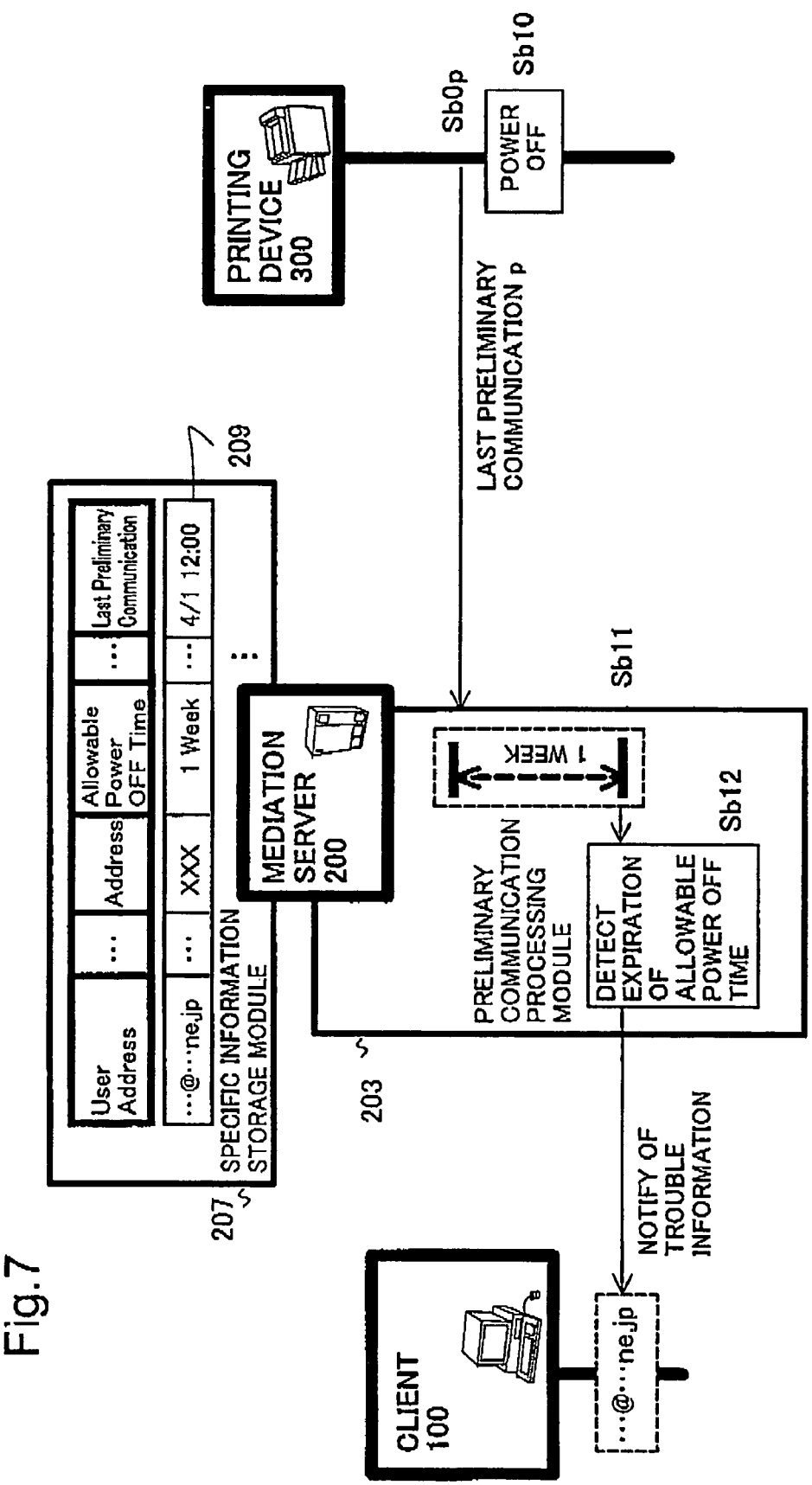
FIG. 7 is a flowchart showing a trouble information notification process.

FIG. 7 is a flowchart showing a trouble information notification process. This is a series of processing executed when communication has been cut off since the last preliminary communication p shown in FIG. 7. In this illustrated example, the printing device 300 is powered off (timing Sb10) immediately after the preliminary communication p (timing SbOp). A registered 'allowable power OFF time' is used for this processing and is set to 1 week for the printing device 300 in this example.

The mediation server 200 stores the time of the last preliminary communication from the printing device as data 209 into its specific information storage module 207.

Figure 8:
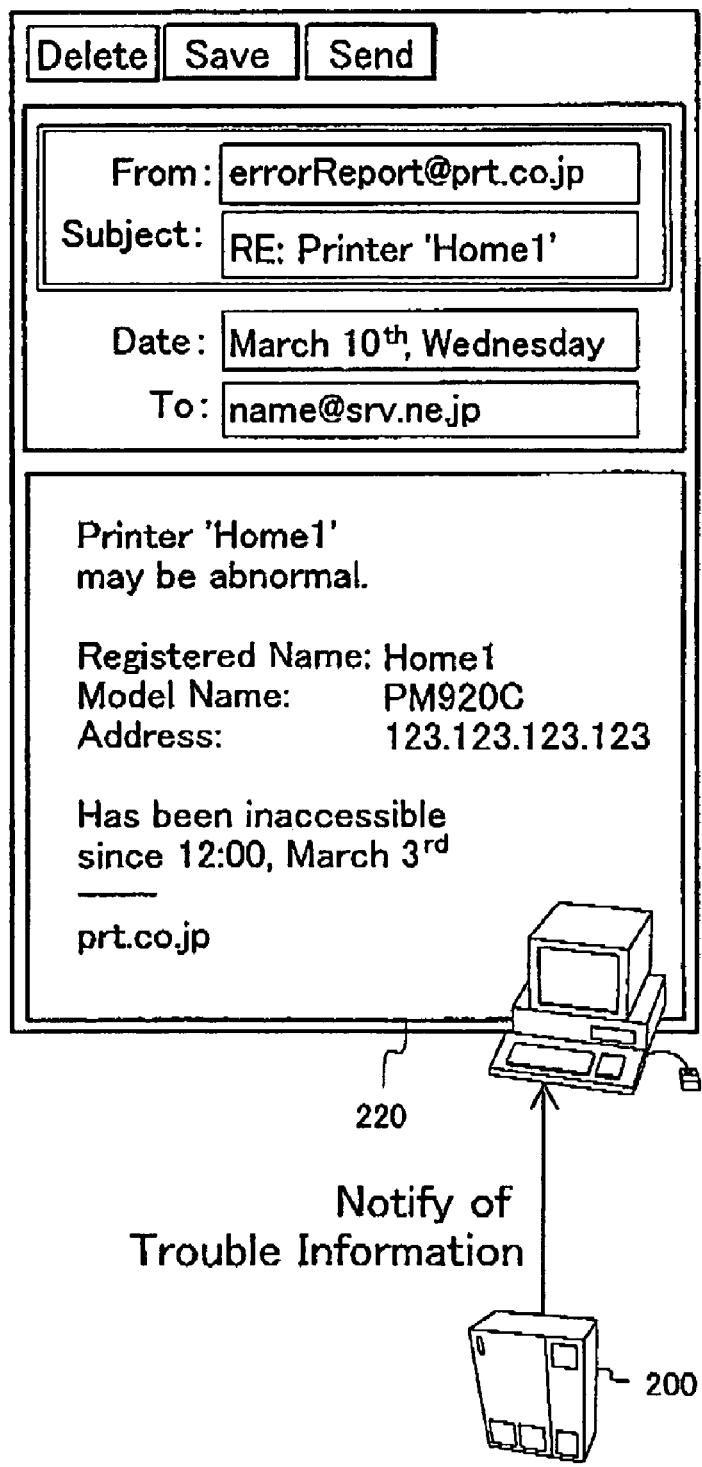
FIG. 8 is an explanatory view showing trouble information.

The mediation server 200 determines whether or not a cutoff time of preliminary communication exceeds the preset allowable power OFF time, based on the time of the last preliminary communication. In response to a detection that the cutoff time of preliminary communication exceeds the preset allowable power OFF time (timing Sb11), the mediation server 200 sends a mail to report trouble information to a registered mail address (timing Sb12). FIG. 8 is an explanatory view showing trouble information. This example shows a display by an e-mail software program installed in the client device 100. As illustrated, trouble information 220 includes the registered name, the model name, and the address of the printing device 300 detected as abnormal, as well as the time of the last preliminary communication.

The technique of this embodiment described above enables the printing device to provide services even in the security environment of the firewall that prevents one-to-one connection of the client device with the printing device at an arbitrary timing.

The user checks the status of each printing device and specifies an available printing device for the service. For more convenience, the mediation server may have a retrieval function or a retrieval assist function to retrieve the user's desired service device.

A5. Modification

In the structure of the first embodiment, always-on connection may be established for preliminary communication of the printing device 300 to the mediation server 200. The always-on connection enables mediation of a service at any time.

The always-on connection may be established by sufficiently shortening the interval of the HTTP request (that is, the interval between timings Sa01 and Sa02 in FIG. 5) in the procedure of the above embodiment. Another method discussed below may be employed for the always-on connection.

The printing device sends an HTTP request to the mediation server to establish connection. The printing device then waits for an HTTP response from the mediation server, while continuously monitoring the connection. When detecting a connection cutoff, the printing device sends a new HTTP request to re-establish the connection immediately. The printing device sends a new HTTP response, when a connection cutoff is expected, as in the case where a preset time out is elapsing, as well as when the connection cutoff is detected. The new HTTP response may be a refresh process (for example, transmission of empty data) to keep the connection. The mediation server may take charge of monitoring and keeping the connection, according to the system configuration.

The system of the modified example practically enables always-on communication of the mediation server with the printing device. This arrangement advantageously shortens the time required for execution of a print demand and enables the mediation server to grasp the status of each printing device, for example, failure information and expendable information, without any delay.

B. Second Embodiment

Figure 9:
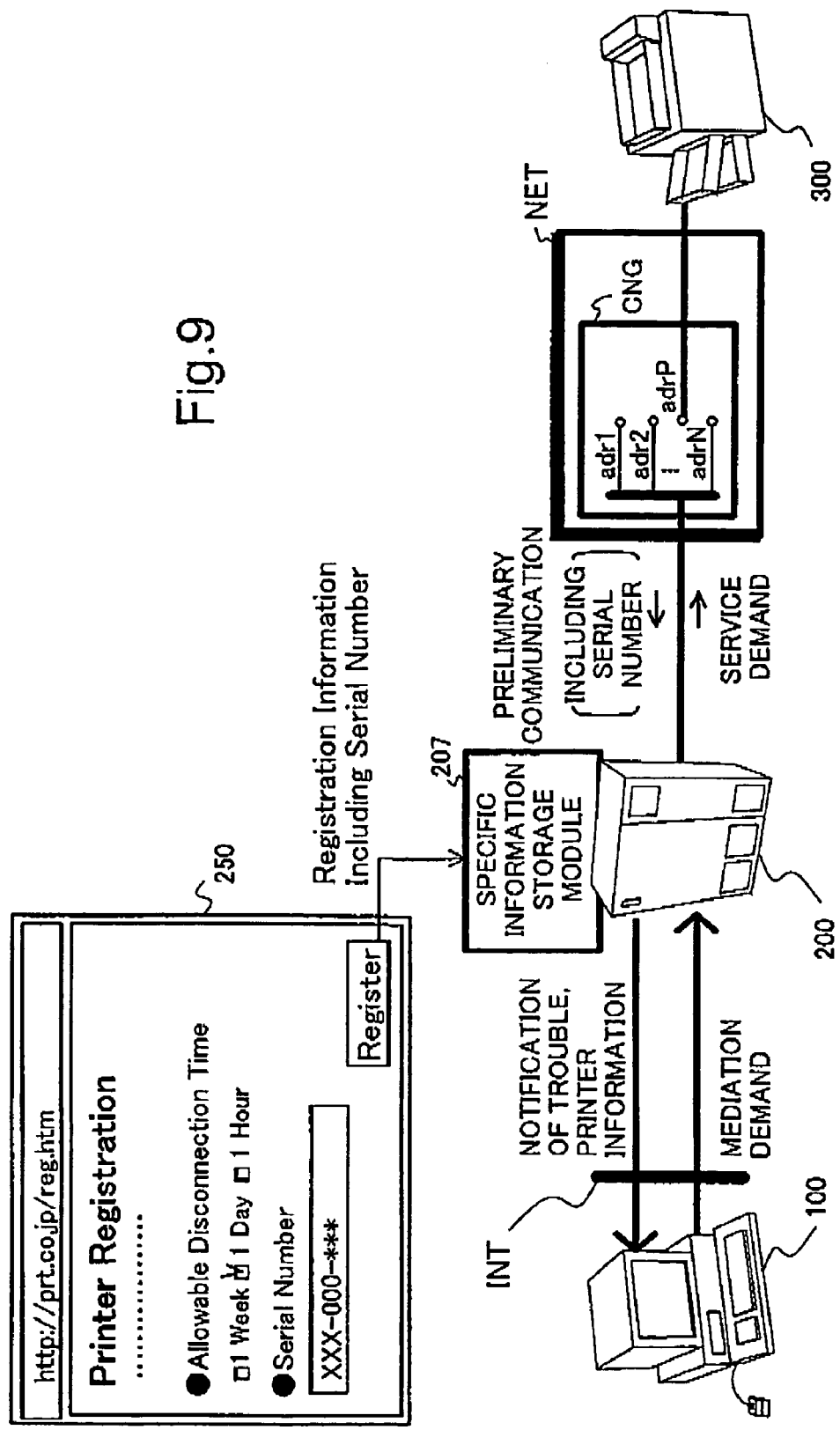
FIG. 9 is an explanatory view showing the system configuration of a second embodiment.

FIG. 9 is an explanatory view showing the system configuration of a second embodiment. The characteristics of the network NET for connecting the mediation server 200 with the printing device 300 in the second embodiment are different from those of the first embodiment. In the structure of the second embodiment, the network NET has a dynamic address change mechanism CNG like NAT (Network Address Translation) or PAT (Port Address Translation). The network NET makes dialup connection of the printing device 300 with the mediation server 200.

In the structure of the second embodiment, the address of the printing device 300 is thus dynamically changed. In the illustrated example of FIG. 9, the dynamic address change mechanism CNG sets the address of the printing device 300 to one of the addresses 'adr1', 'adr2', . . . , 'adrN'.

The mediation server 200 of the second embodiment stores a serial number and an 'allowable disconnection time', respectively in place of the address information of the printing device 300 and the 'allowable power OFF time', into the specific information storage module 207.

When the printing device 300 sends the serial number and the current address on preliminary communication, the mediation server 200 identifies the printing device 300, based on the serial number, and establishes communication. The mediation server 200 monitors whether preliminary communication is normally kept.

In order to keep connection, some communication protocols require transmission of an empty packet at sufficiently short time intervals or another adequate connection-keeping process. Either of the mediation server 200 and the printing device 300 may take charge of such processing. In this case, the mediation server 200 may detect a connection cutoff accompanied with an address change of the printing device, due to a failure or interruption of the connection-keeping processor any other trouble. The structure of this embodiment does not employ a firewall. Any of various protocols is thus applicable to communication between the printing device 300 and the mediation server 200; for example, IPP (Internet Printing Protocol), lpr/lpd, HTTP, and FTP (File Transfer Protocol).

Figure 10:
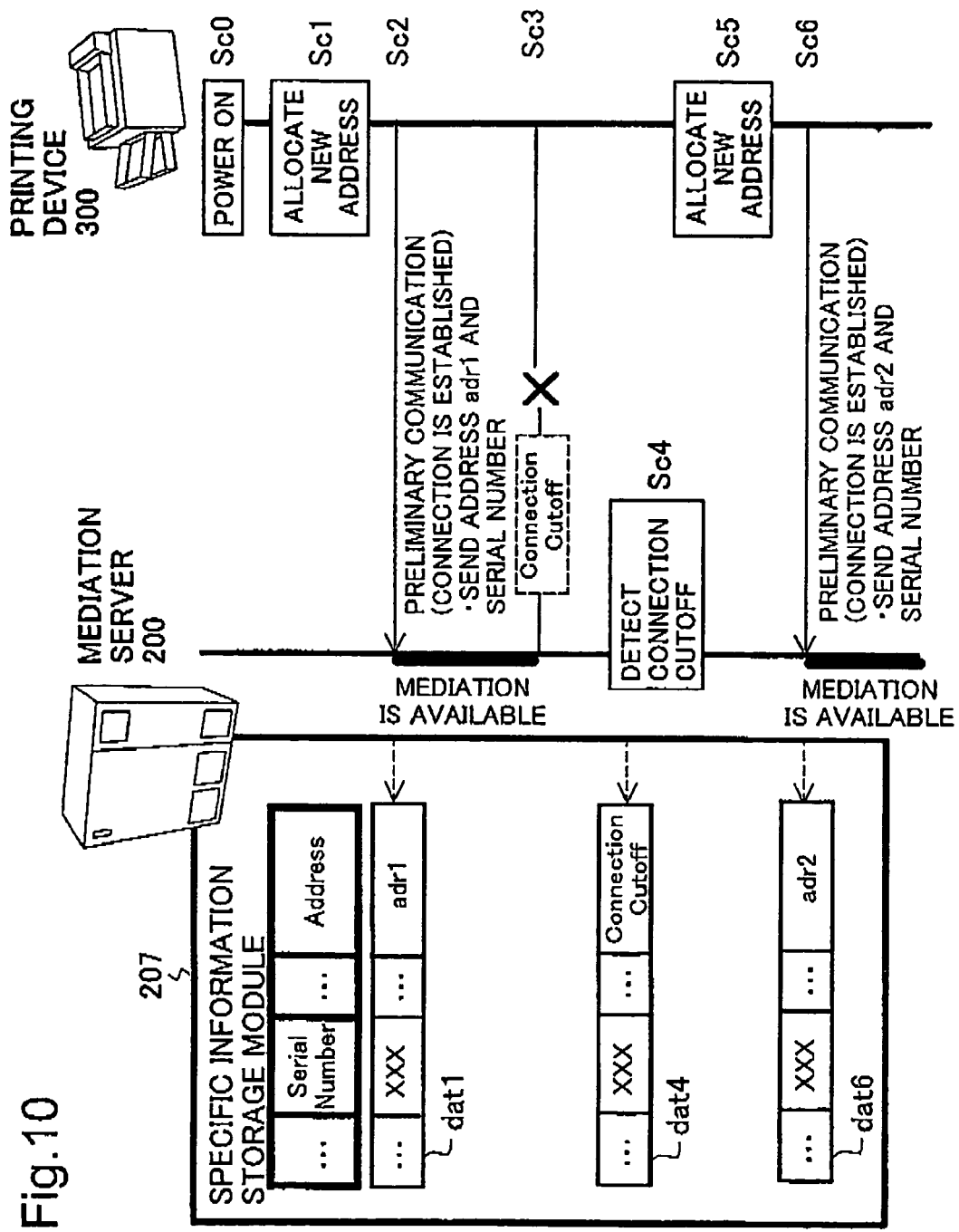
FIG. 10 is a flowchart of preliminary communication in the second embodiment.

FIG. 10 is a flowchart of preliminary communication in the second embodiment. The preliminary communication is made every time the address of the printing device is settled, for example, at each power-on, at the time of recovery of cutoff communication, or in response to the user's request for new address allocation.

In the illustrated example of FIG. 10, in response to a power supply (timing Sc0), a new address 'adr1' is allocated to the printing device 300 (timing Sc2). The printing device 300 notifies the mediation server 200 of this address 'adr1' and the serial number on preliminary communication (timing Sc2).

The mediation server 200 registers the address 'adr1' with the received serial number as a key into the specific information storage module 207 (see data dat1 in FIG. 10).

It is here assumed that the communication between the printing device 300 and the mediation server 200 is cut off, due to some trouble on the network NET or the user's communication cutoff command (timing Sc3). The mediation server 200 detects a cutoff of communication with the printing device 300 (timing sc4) and invalidates the address 'adr1' registered in the printing device 300 (see data dat4 in FIG. 10).

The printing device 300 then reconnects with the network NET and receives a newly allocated address 'adr2' (timing Sc5). The printing device 300 again transmits preliminary communication and reestablishes connection with the mediation server 200 (timing Sc6). The mediation server 200 detects connection with the printing device 300 and updates the stored data in the specific information storage module 207 (see data dat6 in FIG. 10).

The mediation server 200 is allowed to mediate a print demand to the printing device 300 during a time period between the timing Sc2 and the timing Sc3 or during a time period after the timing Sc6. When receiving a printer information request sent from the client device 100 during either of these time periods, the mediation server 200 sends back information on the availability of the printing device 300.

Figure 11:
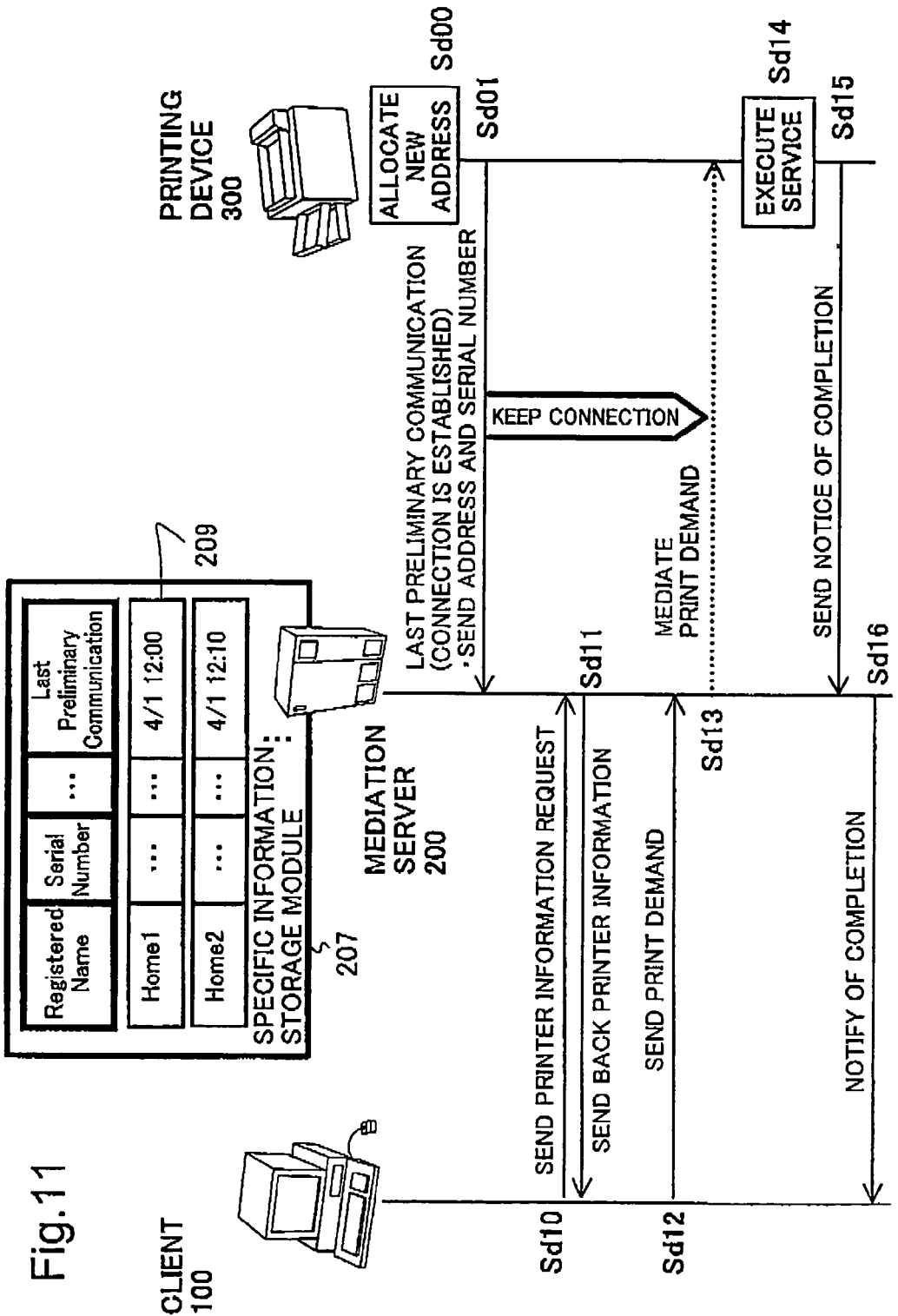
FIG. 11 is a flowchart showing a print mediation process executed in the second embodiment.

FIG. 11 is a flowchart showing a print mediation process executed in the second embodiment.

The mediation server 200 confirms that the last preliminary communication is kept normally and sends the information on the availability of the printing device 300 to the client device 100 (timing Sd11). The confirmation may check the connection status with the printing device 300 or may refer to the past results of detection.

Figure 12:
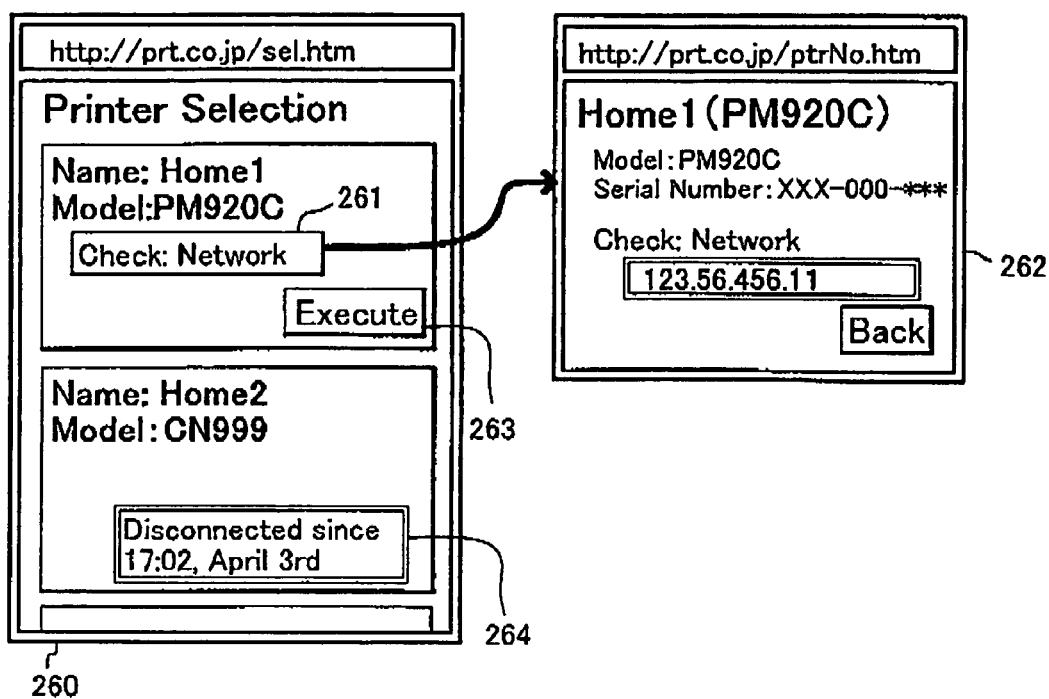
FIG. 12 is an explanatory view showing an interface for the print mediation process in the second embodiment.

FIG. 12 is an explanatory view showing an interface for the print mediation process in the second embodiment. A window 260 for a print demand is opened on the client device 100. The user clicks an execution button 263 to output a print demand (timing Sd13).

A network check button 261 is provided for the available printing device 'Home 1'. A click of this button opens a network check window 262 to check the current address of the printing device 'Home 1'.

The mediation server 200 then mediates the print demand to the printing device 300 (timing Sd13). The printing device 300 receives the print demand and executes the service (timing Sd14). On completion of printing (timing Sd15), the printing device 300 sends a notice of completion (timing Sd16).

In the illustrated example, the communication between the printing device 300 and the mediation server 200 is kept for a time period between the timing Sd01 and the timing Sd13. For mediation of the print demand, however, the only requirement is that the communication between the printing device 300 and the mediation server 200 is established at the timing Sd13. The communication may thus be cut off in the time period between the timing Sd01 and the timing Sd13.

Figure 13:
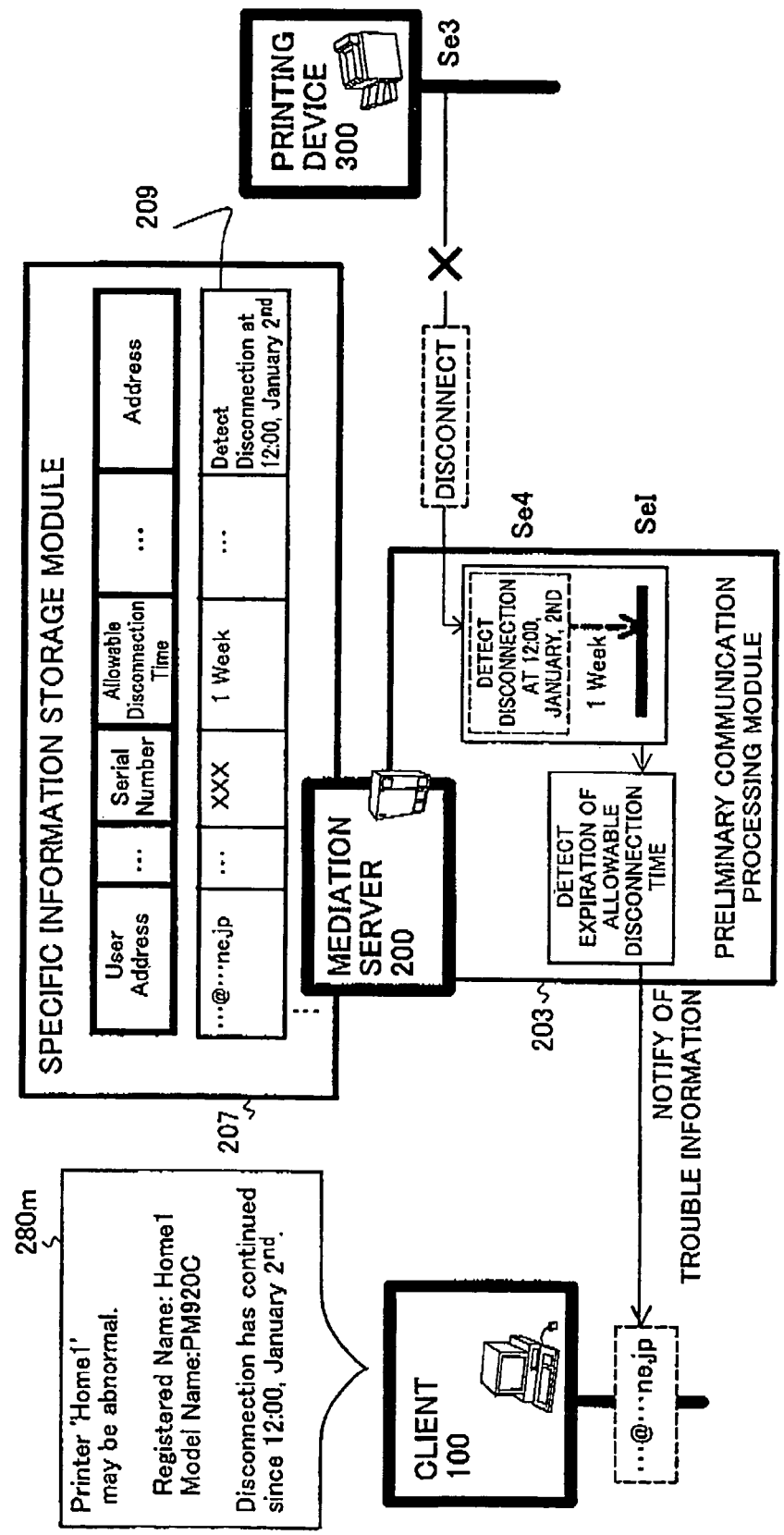
FIG. 13 is a flowchart showing a trouble information transmission process executed in the second embodiment.

FIG. 13 is a flowchart showing a trouble information transmission process executed in the second embodiment. It is assumed that the communication between the printing device 300 and the mediation server 200 is cut off at timing Se3 and the mediation server detects the communication cutoff at timing Se4.

The mediation server 200 determines whether the cutoff time exceeds the 'allowable disconnection time' registered in the specific information storage module 207. When the allowable disconnection time elapses before recovery of the connection (timing SeI), the preliminary communication processing module 203 notifies the user address of a pre-registered destination of trouble information 280*m*.

The arrangement of the second embodiment effectively monitors the status of the printing device and detects an abnormality of the printing device via the network, even when the system adopts the dynamic address change mechanism like NAT or PAT or employs the dialup connection.

C. Third Embodiment

Figure 14:
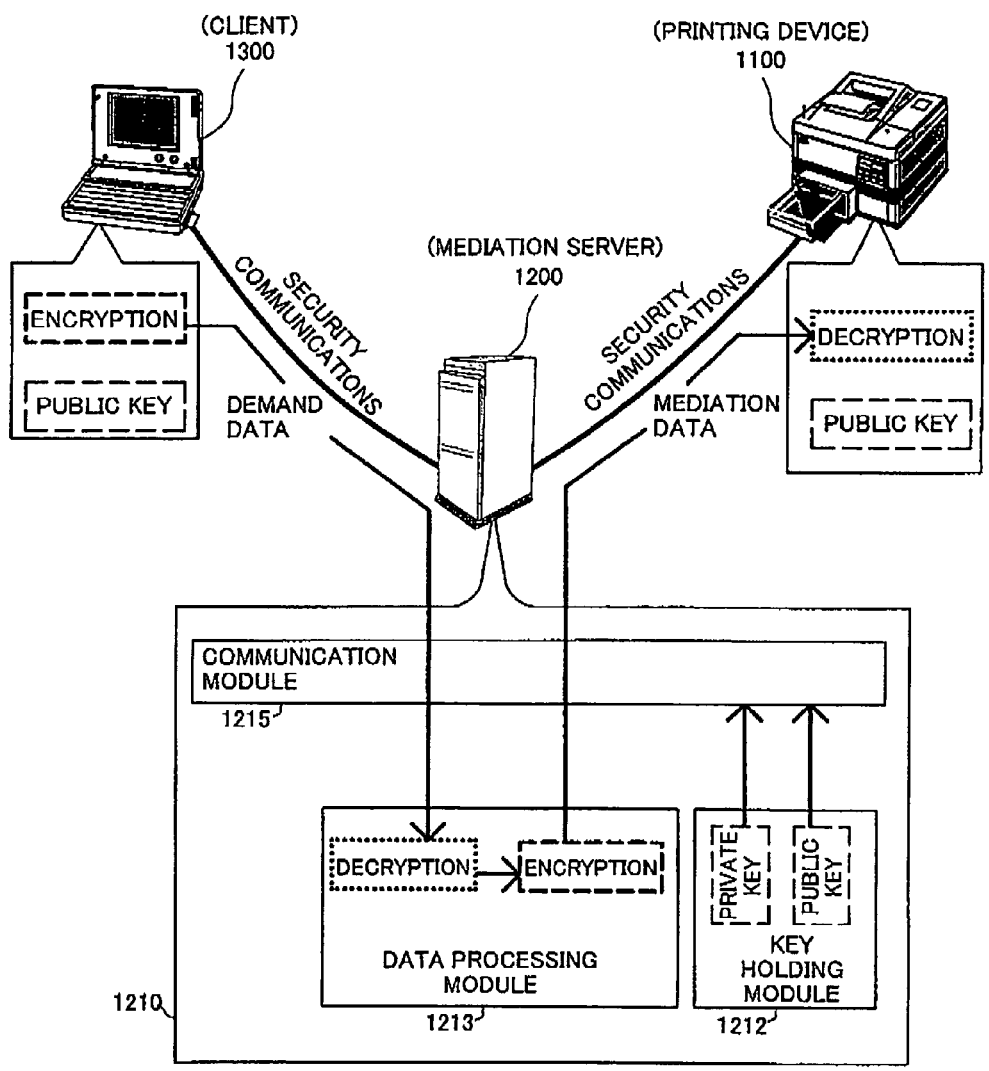
FIG. 14 is an explanatory view illustrating the general configuration of a print mediation system.

FIG. 14 is an explanatory view illustrating the general configuration of a print mediation system. In this system, a mediation server 1200 is connected with a client device 1300 and a printing device 1100 via a network. Any of wide area networks like the Internet and relatively restricted networks like LAN (Local Area Network) and computer online communication may be applied to this network. The numbers of the client device 1300 and the printing devices 1100 are not restricted to one but may be multiple.

The client device 1300 sends a print demand to the mediation server 1200. The mediation server 1200 mediates the received print demand to the printing device 1100. The printing device 1100 executes printing in response to the mediated print demand. The mediation server 1200 functions as a server of security communication and thus establishes security communications with the client device 1300 and with the printing device 1100. The security communication may be any of various encrypted communications, for example, SSL, that utilize both a private key kept confidentially by the server and a public key open to the public.

The functional block structure of the mediation server 1200 is also shown in FIG. 14. The mediation server 1200 has a control unit 1210, which is constructed as a microcomputer including a CPU and memories. The respective functional blocks are implemented by software configuration, although they may be embodied by hardware.

A communication module 1215 takes charge of communications with the client device 1300 and with the printing device 1100. The communication module 1215 may establish security communications by utilizing the SSL technique. A key holding module 1212 keeps a private key and a public key for security communications.

A data processing module 1213 receives a print demand sent from the client device 1300 via the communication module 1215, while mediating the received print demand to the printing device 1100. Such reception and the mediation may be attained through security communications with the client device 1300 and with the printing device 1100. The data processing module 1213 decrypts the demand data encrypted by the client device 1300 and re-encrypts the decrypted data in a format decryptable by the printing device 100.

When a print object is specified by a URL (Uniform Resource Locator), the data processing module 1213 may obtain an image file or another relevant file based on the URL, encrypt the file, and send the encrypted file as part of the print demand to the printing device 1100.

Figure 15:
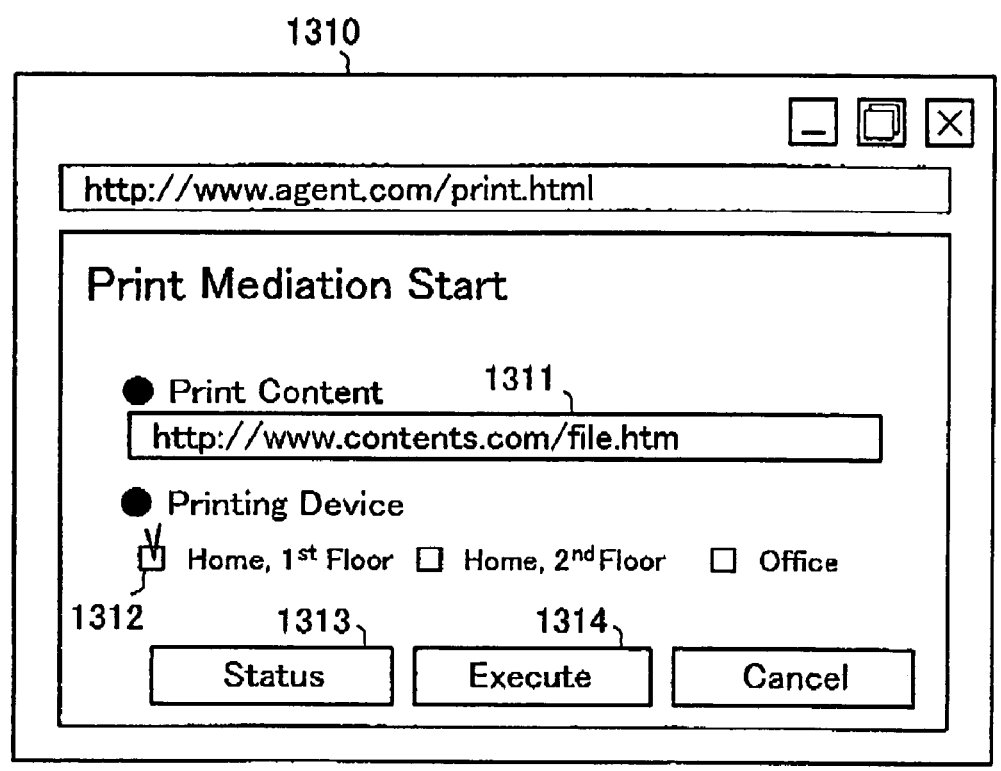
FIG. 15 is an explanatory view showing an interface for a print demand.

FIG. 15 is an explanatory view showing an interface for a print demand, which is opened by the browser of the client device 1300.

On a print demand window 1310, the user specifies a print object by its URL entered in a content specification field 1311 and ticks a selected one of print destination specification checkboxes 1312 to specify the print destination. In response to the user's click of an execution button 1314, the browser encrypts a print demand and sends the encrypted print demand to the mediation server 1200. The print demand may include the URL or the file itself specified by the URL.

Figure 16:
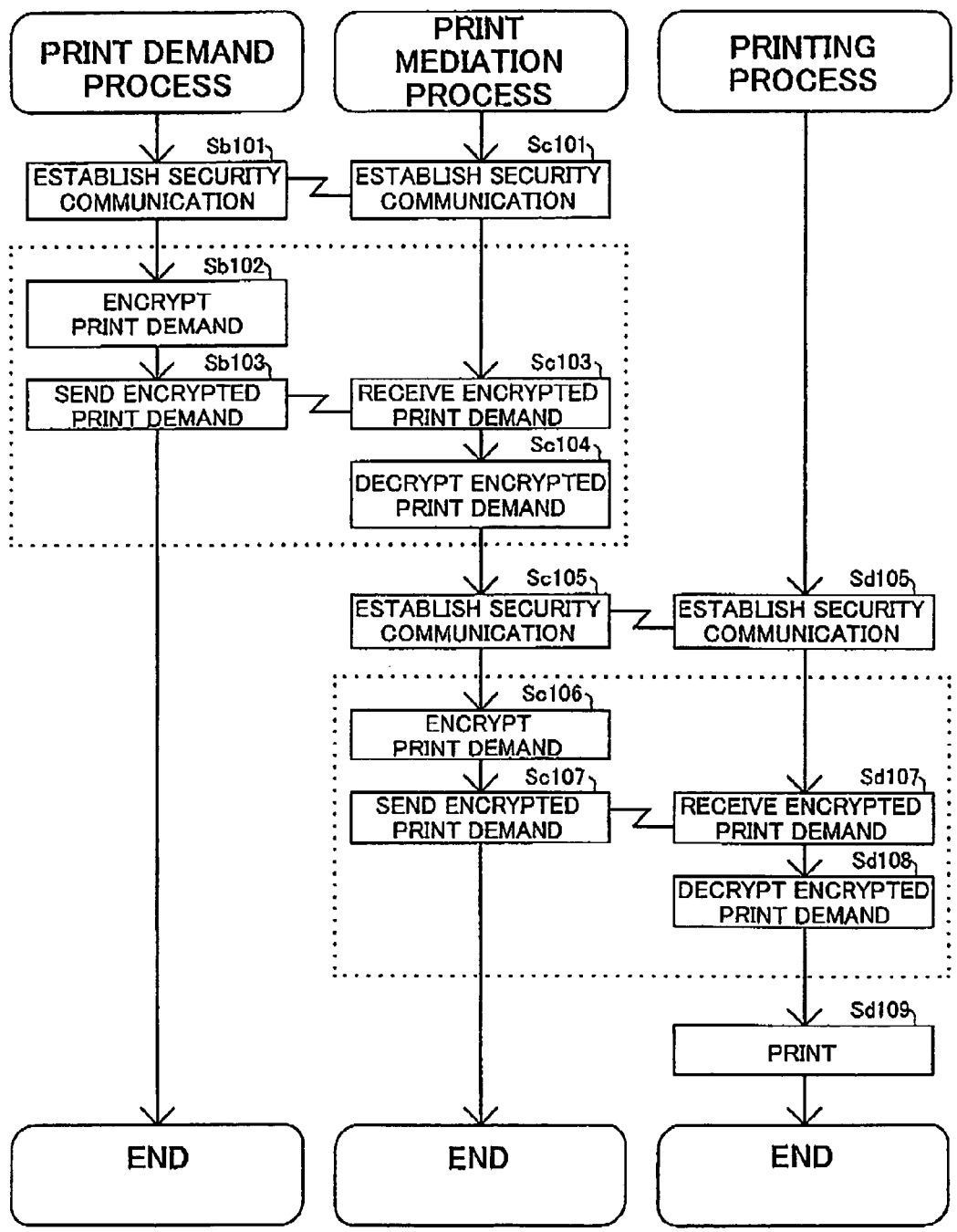
FIG. 16 is a flowchart showing a print mediation process.

FIG. 16 is a flowchart showing a print mediation process.

Figure 21:
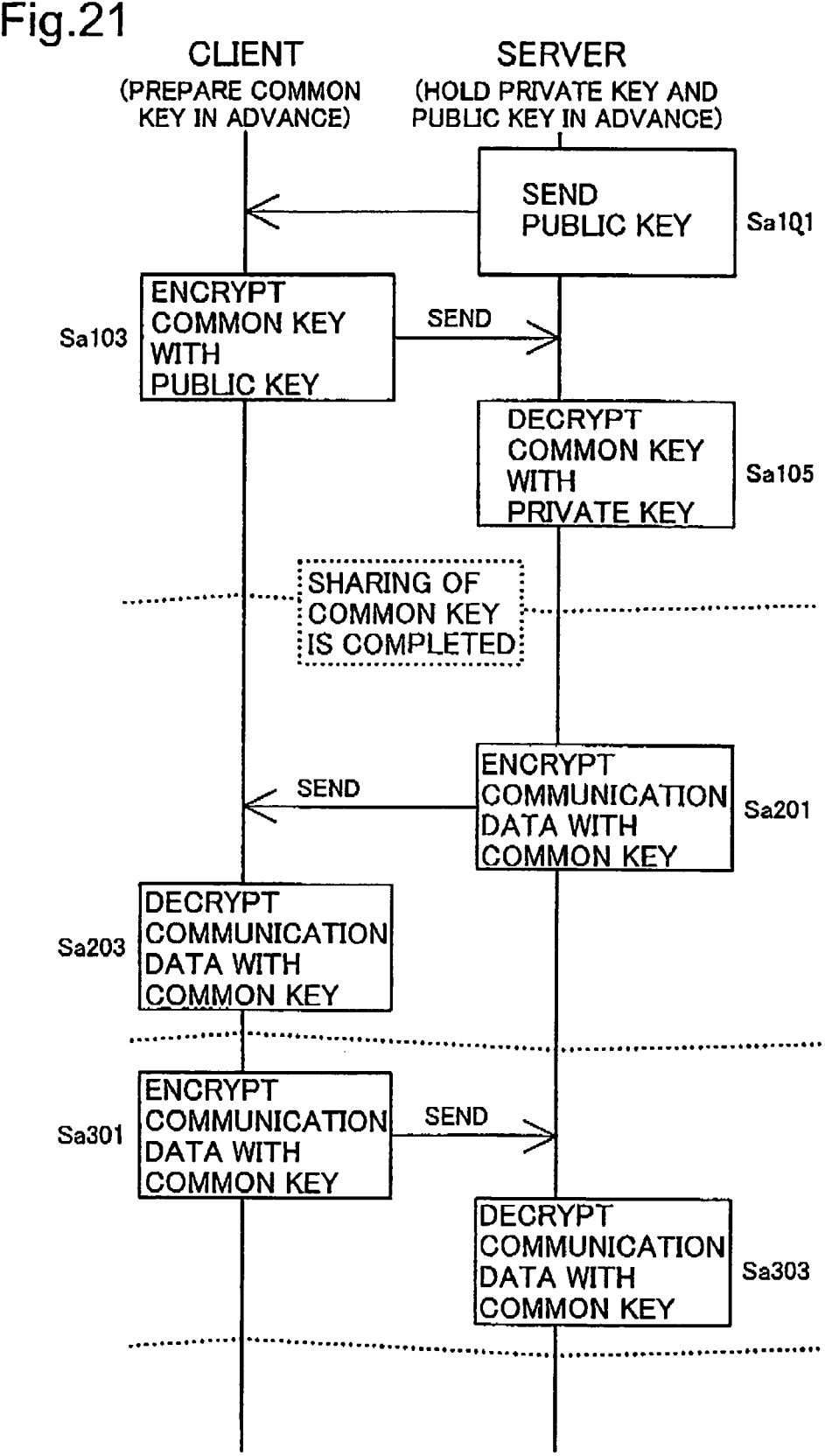
FIG. 21 is an explanatory view showing security communication in a public key cryptosystem.

The client device 1300 and the mediation server 1200 establish mutual security communications according to the procedure discussed above with reference to FIG. 21 (steps Sb101 and Sc101).

The client device 1300 encrypts a print demand with a common key and sends the encrypted print demand to the mediation server 1200 (steps Sb102 and Sb103).

The mediation server 1200 receives the encrypted print demand and decrypts the encrypted print demand with the common key (steps Sc103 and Sc104).

The mediation server 1200 and the printing device 1100 then establish mutual security communications, and the printing device 1100 sends a common key to the mediation server 1200 (steps Sc105 and Sd105).

The mediation server 1200 encrypts the print demand with the common key shared with the printing device (step Sc106). At step Sc107, the mediation server 1200 sends the encrypted print demand as mediation data to the printing device 1100.

The printing device 1100 receives the encrypted print demand from the mediation server 1200, decrypts the encrypted print demand with the common key, and executes printing (steps Sd107, Sd108, and Sd109).

The technique of this embodiment centrally manages the private key and takes advantage of security communications via the network.

The robust central management device against illicit accesses readily prevents leakage of the private key. The client device is not required to independently manage the key. This arrangement desirably relieves the user's labor for installation and updating of the key in the client device.

In this embodiment, the client device 1300 and the printing device 1100 may authenticate the mediation server 1200. For example, the client device 1300 obtains a server certificate of the mediation server 1200 from an authentication server, to authenticate the mediation server 1200. On the contrary, the mediation server 1200 may authenticate the client device 1300 and the printing device 1100.

The private key kept by the key holding module 1212 may be one or multiple. For example, different private keys may be shared with the client device 1300 and with the printing device 1100.

D. Fourth Embodiment

In a fourth embodiment, a mediation server selectively uses security communication and standard communication according to the contents and the direction of communication.

Figure 17:
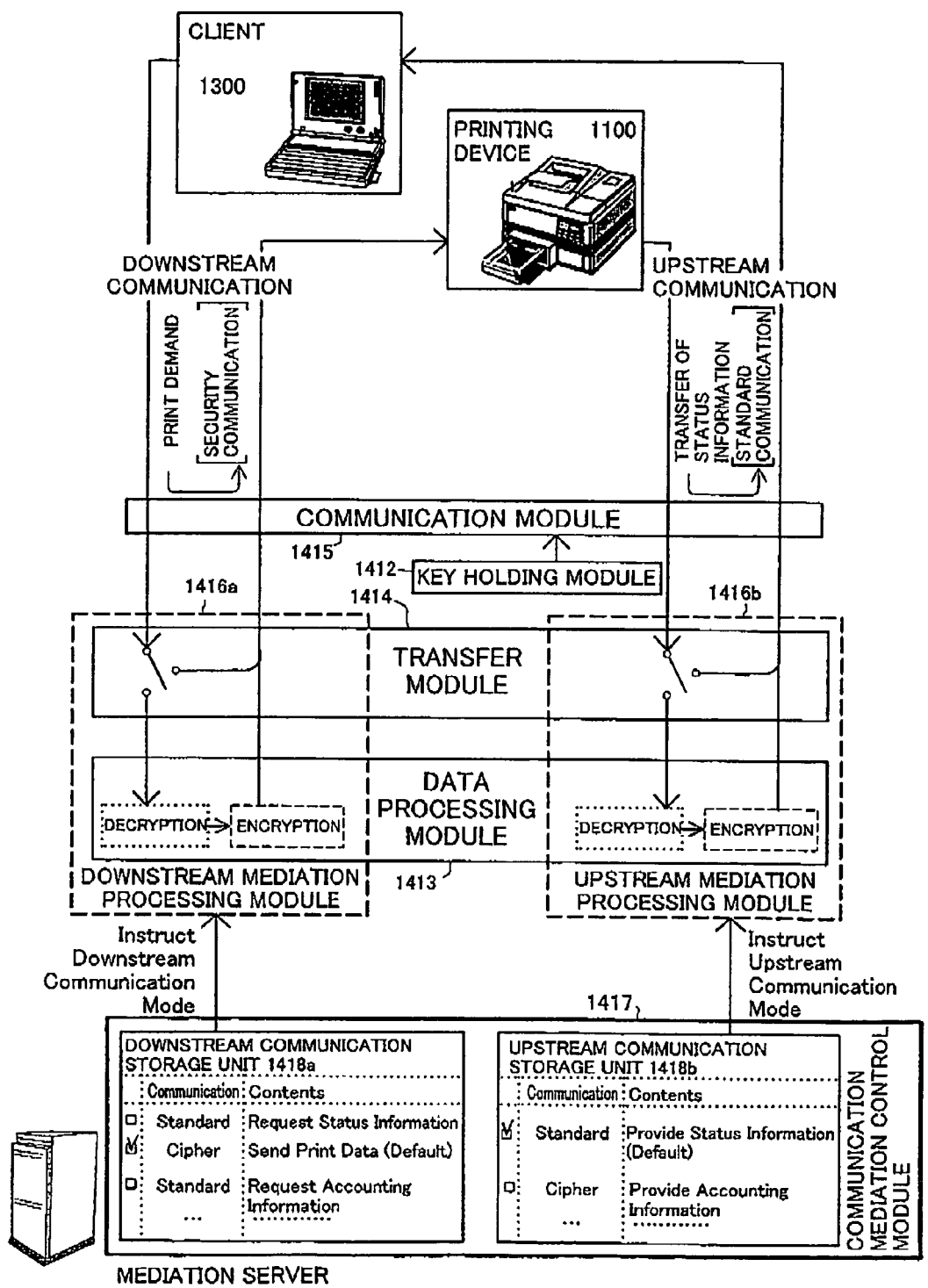
FIG. 17 is an explanatory view showing communication control in a fourth embodiment.

FIG. 17 is an explanatory view showing communication control in the fourth embodiment.

A mediation server 1400 mediates mutual communications between the client device 1300 and the printing device 1100. In the description hereafter, communication from the client device 1300 to the printing device 1100 is called 'downstream communication', whereas communication from the printing device 1100 to the client device 1300 is called 'upstream communication'. The mediation server 1400 employs different strategies for the upstream communication and the downstream communication.

Transmission of a print demand from the client device 1300 to the printing device 1100 is downstream communication. The mediation server 400 adopts security communication for this downstream communication. The process of obtaining status information from the printing device 1100 and transferring the status information to the client device 1300 is upstream communication. The mediation server 400 adopts non-security, standard communication for this upstream communication. Adoption of the security communication does not simply depend upon the direction of communication, that is, the upstream communication or the downstream communication, but is determined according to the contents of communication. For example, when the printing device provides commercial print services, the mediation server 1400 adopts the security communication for transmission of accounting information from the printing device 1100 to the client device 1300 by upstream communication.

The functional block structure of the mediation server 1400 is also shown in FIG. 17.

A communication module 1415, a key holding module 1412, and a data processing module 1413 have the similar functions to those of the corresponding modules in the third embodiment. The data processing module 1413 carries out encryption and decryption in security communication. A transfer module 1414 selects either security communication or standard communication, based on the contents of communication, and transfers data not via the data processing module 1413 but directly in the case of standard communication.

The transfer module 1414 and the data processing module 1413 are parted into a downstream mediation processing module 1416a for downstream communication and an upstream mediation processing module 416b for upstream communication.

A communication mediation control module 1417 has the functions of controlling the downstream mediation processing module 416a and the upstream mediation processing module 416b.

The communication mediation control module 1417 has a downstream communication storage unit 1418a and an upstream communication storage unit 1418b. The downstream communication storage unit 1418a relates the requirement of security communication to each type of the contents of downstream communication. The upstream communication storage unit 1418b relates the requirement of security communication to each type of the contents of upstream communication.

Figure 18:
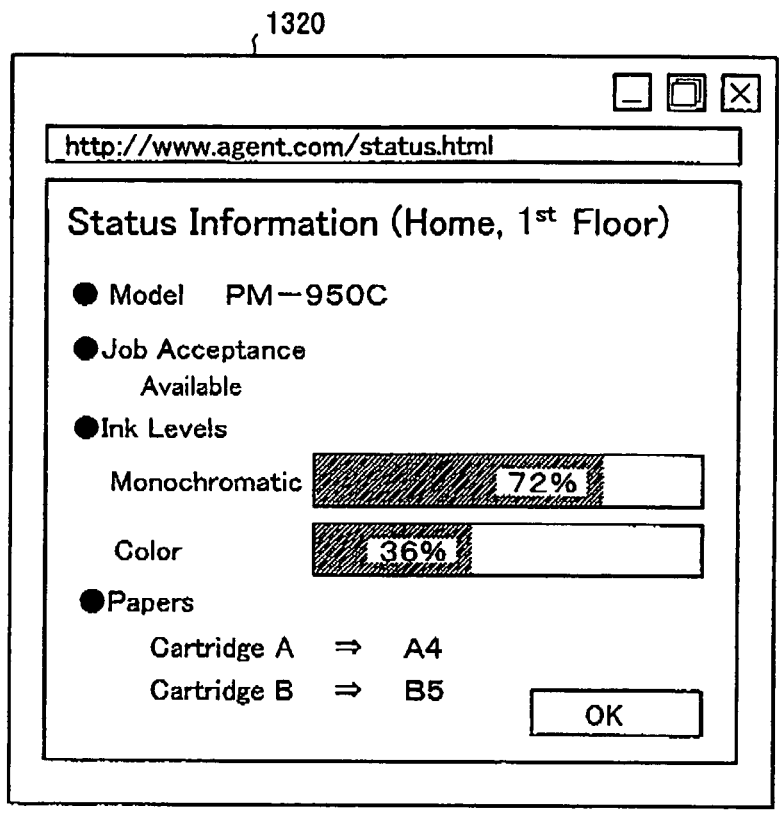
FIG. 18 is an explanatory view showing an interface for obtaining status information.

FIG. 18 is an explanatory view showing an interface for obtaining status information.

A browser window 1320 displays the status information of the printing device 1100. This window is opened, in response to a click of a status information display button 1313 on the browser window 1310 of FIG. 15. The mediation server 1400 obtains status information from the printing device 1100 in response to the click and gives the browser window 1320 to the client device 1300.

The browser window 1320 shows the status information of the printing device 1100. The status information displayed here includes the acceptability status for a print demand, the current ink levels, and the currently set paper types.

Figure 19:
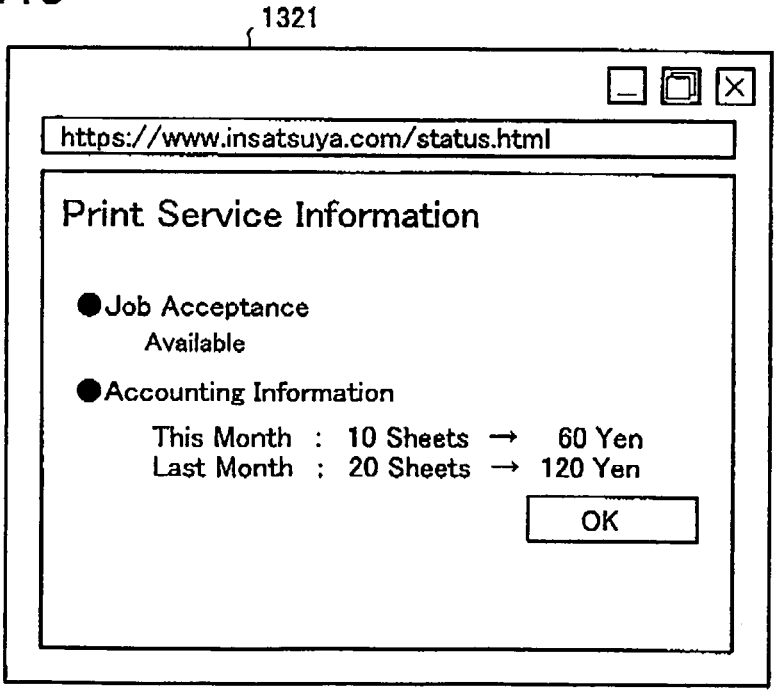
FIG. 19 is an explanatory view showing a display of accounting information.

FIG. 19 is an explanatory view showing a display of accounting information. In this illustrated example, the printing device 1100 provides paid print services. A window 1321 shows the status information of the printing device 1100 and accounting information of this month and last month.

In both the illustrated examples of FIGS. 18 and 19, the mediation server 400 mediates the upstream communication from the printing device 1100 to the client device 1300. The mediation server 1400 adopts standard communication for display of the status information in the example of FIG. 18, while adopting security communication for display of the accounting information in the example of FIG. 19.

Figure 20:
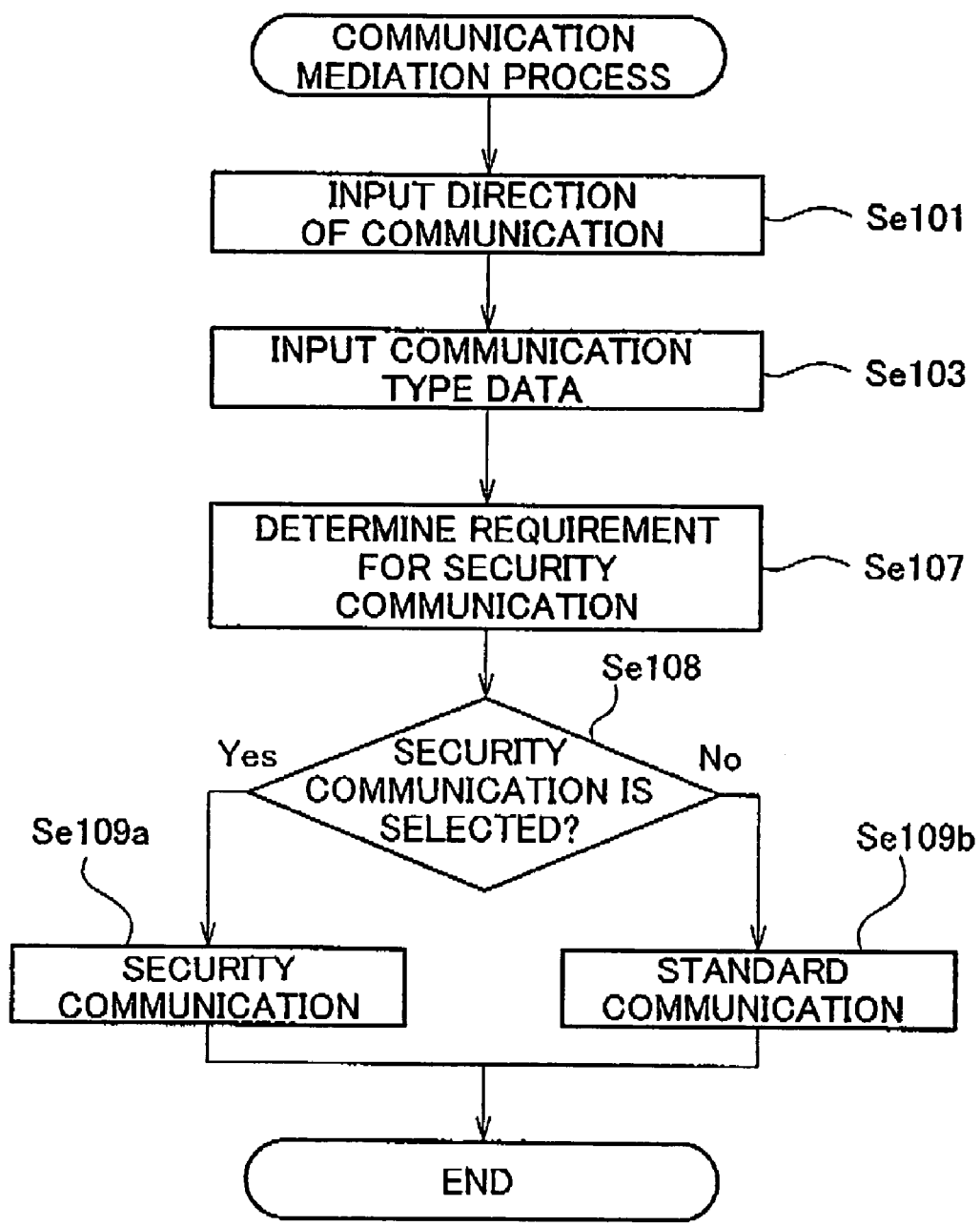
FIG. 20 is a flowchart showing a communication mediation process.

FIG. 20 is a flowchart showing a communication mediation process, which is executed by the mediation server 1400.

At step Se101, the communication mediation control module 1417 inputs a direction of communication to be mediated, either upstream communication or downstream communication. The communication mediation control module 1417 also inputs communication type data (step Se103).

The mediation server 1400 then refers to either of the downstream communication storage unit 418a and the upstream communication storage unit 418b, and determines requirement for security communication (step S107). For example, security communication is selected for mediation of a print demand. Standard communication is selected for transmission of status information, while security communication is selected for transmission of accounting information. When no record corresponding to the contents of communication is retrieved in the downstream communication storage unit 418a or the upstream communication storage unit 418b, default setting may be applied. The procedure of this embodiment adopts the security communication for downstream communication and the standard communication for upstream communication as default settings.

When the security communication is selected (step Se108), the mediation server 1400 makes security communication through decryption and re-encryption of data (step Se109a). When the standard communication is selected (step Se108), on the other hand, the mediation server 1400 makes communication without decryption and encryption of data (step Se109b).

This embodiment selectively uses security communication and standard communication according to the contents and the direction of communication. The security communication requires decryption and re-encryption of data. Combination with the standard communication thus desirably relieves the load of the mediation server.

The procedure of the fourth embodiment may vary the encryption level in security communication according to the contents of communication. The encryption level may be varied, for example, by changing the encryption method or by changing the bit length of the key used for encryption.

The requirement for security communication may be given as an instruction from the printing device 1100 or the client device 1300 to the mediation server 1400.

The embodiments discussed above are to be considered in all aspects as illustrative and not restrictive. There may be many modifications, changes, and alterations without departing from the scope or spirit of the main characteristics of the present invention. For example, the series of processing discussed above may be actualized by a hardware construction, instead of the software configuration.

INDUSTRIAL APPLICABILITY

The present invention is applicable to a technique for causing a service device to provide a service, and for establishing security communications in a secure network environment while reducing load of key management.

What is claimed is:

1. A service-demand transfer apparatus for receiving a service demand from a client device and transmitting the received service demand to a service device for providing a predetermined service via a network, the apparatus comprising:

a service device communication module for receiving a specific preliminary communication from the service device prior to the receipt of a service demand, and establishing communication with the service device in response to reception of the preliminary communication;

a selective information provision module for providing the client device with information to be used for specifying the service device in established communication as a destination of the transmission of the service demand;

a receiving module for receiving the service demand and specification of the destination of the transmission; and a transmitting module for transmitting the received service demand to the specified destination of the transmission, wherein the client device and the service device are connected to the network in a specific environment that does not allow the client device and the service device to establish one-to-one connection at an arbitrary timing, while the client device and the service-demand transfer apparatus are connected to the network in an environment that allows the client device and the service-demand transfer apparatus to establish one-to-one connection at an arbitrary timing.

2. The apparatus in accordance with claim 1, wherein the communication is established by connection between the service device and the apparatus which is initiated from the service device.

3. The apparatus in accordance with claim 1, wherein the specific environment is an environment that changes information for identifying a communication path to the service device.

4. The apparatus in accordance with claim 1, further comprising a specific information storage module for storing specific information for identifying the service device,
  wherein the service device is identified by comparison between at least part of information received on the preliminary communication and the specific information.

5. The apparatus in accordance with claim 4, wherein the specific information is different from an address of the service device on the network.

6. The apparatus in accordance with claim 1, further comprising a preliminary communication processing module for checking a status of communication to be established based on the preliminary communication, and sending a notice representing a result of the check to a preset destination related to the service device.

7. The apparatus in accordance with claim 6, further comprising a specific information storage for storing specific information for identifying the service device and the destination related to the service device,
  wherein the preliminary communication processing module sends the notice to a destination identified by a comparison between at least part of information received on the preliminary communication and the specific information.

8. A service-demand transfer method of causing a computer connecting with a network to receive a service demand from a client device and transmit the received service demand to a service device for providing a predetermined service via a network, the method comprising:
  receiving a specific preliminary communication from the service device prior to the receipt of the service demand, and establishing communication with the service device in response to the reception of the preliminary communication;
  providing the client device with information to be used for specifying the service device in established communication as a destination of the mediation of the service demand;
  receiving the service demand and specification of the destination of the transmission; and
  transmitting the input service demand to the specified destination of the destination,
  wherein the client device and the service device are connected to the network in a specific environment that does not allow the client device and the service device to establish one-to-one connection at an arbitrary timing, while the client device and the service-demand transfer apparatus are connected to the network in an environment that allows the client device and the service-demand transfer apparatus to establish one-to-one connection at an arbitrary timing.

9. A computer readable recording medium on which a computer program is recorded, the computer program causing a service-demand transfer apparatus to receive a service demand from a client device and to transmit the received service demand to a service device for provides a predetermined service, the computer program causing the service-demand transfer apparatus to implement the functions of:
  receiving a specific preliminary communication from the service device prior to the receipt of the service demand, and establishing communication with the service device in response to the reception of the preliminary communication;
  providing the client device with information to be used for specifying the service device in established communication as a destination of the transmission of the service demand;
  receiving the service demand and specification of the destination of the transmission; and
  transmitting the input service demand to the specified destination of the transmission,
  wherein the client device and the service device are connected to the network in a specific environment that does not allow the client device and the service device to establish one-to-one connection at an arbitrary timing, while the client device and the service-demand transfer apparatus are connected to the network in an environment that allows the client device and the service-demand transfer apparatus to establish one-to-one connection at an arbitrary timing.

* * * * *